(12) United States Patent
Krishnam et al.

(10) Patent No.: US 11,346,428 B2
(45) Date of Patent: May 31, 2022

(54) MANUAL DUAL CLUTCH POWER TRANSMISSION UNIT FOR A VEHICLE

(71) Applicant: MAHINDRA & MAHINDRA LIMITED, Tamilnadu (IN)

(72) Inventors: Raju Krishnam, Tamilnadu (IN); K. V. V. Srinivasa Rao, Tamilnadu (IN); Devakumar Raja Janarthan, Tamilnadu (IN)

(73) Assignee: MAHINDRA & MAHINDRA LIMITED, Tamilnadu (IN)

( * ) Notice: Subject to any disclaimer, the term of this patent is extended or adjusted under 35 U.S.C. 154(b) by 471 days.

(21) Appl. No.: 16/328,496

(22) PCT Filed: Aug. 31, 2017

(86) PCT No.: PCT/IN2017/050370
§ 371 (c)(1),
(2) Date: Feb. 26, 2019

(87) PCT Pub. No.: WO2018/042455
PCT Pub. Date: Mar. 8, 2018

(65) Prior Publication Data
US 2021/0285522 A1    Sep. 16, 2021

(30) Foreign Application Priority Data

Aug. 31, 2016 (IN) .............................. 201641029831
Aug. 31, 2016 (IN) .............................. 201641029834
Aug. 31, 2016 (IN) .............................. 201641029835

(51) Int. Cl.
*F16H 3/093* (2006.01)
*F16H 3/00* (2006.01)
(Continued)

(52) U.S. Cl.
CPC .............. *F16H 3/006* (2013.01); *F16H 3/093* (2013.01); *F16H 37/043* (2013.01); *F16H 59/04* (2013.01);
(Continued)

(58) Field of Classification Search
CPC .......... F16H 3/006; F16H 3/093; F16H 59/04; F16H 63/02; F16H 2037/049; F16H 2063/025; F16H 2200/0078
See application file for complete search history.

(56) References Cited

U.S. PATENT DOCUMENTS

2018/0372188 A1 * 12/2018 Hana ..................... F15B 21/041
2020/0393020 A1 * 12/2020 Bulgrien ................. F16H 3/085

FOREIGN PATENT DOCUMENTS

CN    105172588 A    12/2015
JP    2002-089594 A    3/2002

OTHER PUBLICATIONS

International Search Report for PCT/IN2017/050370 dated Dec. 20, 2017, citing the above reference(s).

* cited by examiner

*Primary Examiner* — William C Joyce
(74) *Attorney, Agent, or Firm* — Hauptman Ham, LLP

(57) ABSTRACT

Manual dual clutch power transmission unit 10 for a vehicle (tractor, constructional vehicle and the like), which comprises a synchro-shuttle transmission unit 10S (forward/reverse drive transmission), a hydro-mechanical operated a dual clutch unit 10D, a multi-speed transmission unit 10T (8 speed transmission unit), a range transmission unit 10R (3 ranges—low range, medium range and high range), a hydro-mechanical transmission control mechanism 100 which controls shifting and selection of gears (odd gear and/or even gear) and corresponding clutches (odd clutch and/or even clutch) respectively, and an auxiliary transmission actuation
(Continued)

mechanism 200 which actuates the power transmission unit 10 when at least one of the hydraulic dual clutch unit 10D of the power transmission unit 10 and a hydraulic system of the vehicle is not functioning, wherein the transmission control mechanism 100 for the multi-speed transmission unit 10T is provided with Z-gate sequential gear shift pattern.

4 Claims, 29 Drawing Sheets

(51) Int. Cl.
*F16H 37/04* (2006.01)
*F16H 59/04* (2006.01)
*F16H 63/02* (2006.01)
*F16D 13/72* (2006.01)
*F16D 13/74* (2006.01)

(52) U.S. Cl.
CPC .............. *F16H 63/02* (2013.01); *F16D 13/72* (2013.01); *F16D 13/74* (2013.01); *F16H 2037/049* (2013.01); *F16H 2063/025* (2013.01); *F16H 2200/0078* (2013.01); *F16H 2200/0082* (2013.01)

MANUAL DUAL CLUTCH POWER TRANSMISSION UNIT FOR A VEHICLE

CROSS REFERENCE TO RELATED APPLICATIONS

This present application is a national stage filing under 35 U.S.C § 371 of PCT application number PCT/IN2017/050370 filed on Aug. 31, 2017 which is based upon and claims the benefit of priority to Indian Patent Application Nos. 201641029831, 201641029834, and 201641029835, all filed on Aug. 31, 2016 in the Indian Intellectual Property Office. The disclosures of the above-listed applications are hereby incorporated by reference herein in their entirety.

TECHNICAL FIELD

The embodiments herein generally relate to power transmission unit in vehicles and more particularly, to a manual dual clutch power transmission unit for a vehicle (tractor, constructional vehicle and the like), which comprises a synchro-shuttle transmission unit (forward/reverse drive transmission); a hydro-mechanical operated dual clutch unit (dual wet clutch), where the hydraulic dual clutch unit is mounted onto a separate shaft (called as wet clutch shaft); a multi-speed transmission unit (8 speed transmission unit); a range transmission unit (3 ranges—low range, medium range and high range) thereby providing the vehicle with 24 forward speeds and 24 reverse speeds; a hydro-mechanical transmission control mechanism which controls shifting and selection of gears (odd gear and/or even gear) in the multi-speed transmission unit and corresponding selection of clutches (odd clutch and/or even clutch) respectively in the hydraulic dual clutch unit; and an auxiliary transmission actuation mechanism (can be considered as tow start mechanism/manual transmission starting mechanism) which actuates the power transmission unit (drives an output shaft of the multi-speed transmission unit in the power transmission unit) therein to transmit the power from an engine to the wheels of the vehicle thereby propelling the vehicle when at least one of the hydraulic dual clutch unit (dual wet clutch) and a hydraulic system of the vehicle is not functioning or working, wherein the transmission control mechanism for the multi-speed transmission unit is provided with Z-gate sequential gear shift pattern having an upshift gate for upshifting gears and a downshift gate for downshifting gears.

BACKGROUND

Generally, a power transmission system of a vehicle is used for transmitting power from an engine or an electric motor to the wheels of the vehicle for propelling the vehicle. A conventional dual clutch power transmission system in a vehicle includes a dual clutch unit, a first input shaft coupled to an odd clutch unit of the dual clutch unit, a second input shaft coupled to an even clutch unit of the dual clutch unit, an output shaft, a plurality of odd drive gears (first drive gear, third drive gear and fifth drive gear) are adapted to be rotatably mounted/connected to the first input shaft at corresponding predetermined positions, a plurality of even drive gears (second drive gear, fourth drive gear and sixth drive gear) are adapted to be rotatably mounted/connected to the second input shaft at corresponding predetermined positions, a plurality of odd driven gears (first driven gear, third driven gear and fifth driven gear) are adapted to be rotatably mounted/connected the output shaft at corresponding predetermined positions, a plurality of even driven gears (second driven gear, fourth driven gear and sixth driven gear) are adapted to be mounted onto the output shaft at corresponding predetermined positions, an electro-hydraulic control valve block and may include other standard components as present in a standard power transmission system. The first input shaft is co-axial to the second input shaft. The second input shaft is a hollow shaft thereby enabling the first input shaft to be provide inside the second input shaft. The first input shaft and the second input shaft is parallel to the output shaft. The electro-hydraulic control valve block control the dual clutch unit. The elector-hydraulic control valve block is efficient in controlling the dual clutch unit. However, the elector-hydraulic control valve block is subjected (prone) to errors due to malfunctioning of some electrical and/or electronic components/device.

Conventional power transmissions units include a counter shaft transmission, a power shift transmission (planetary gear train transmission) and a continuously variable transmission (CVT)/Infinitely variable transmission (IVT). In counter shaft transmissions forward reverse synchronizers are replaced by the multi-plate friction clutches. Typically, the multi-plate clutches are arranged on the main shaft or on the counter shaft. The forward reverse section of the gear box is generally located in the forward section as close to the engine as possible as a result the forward reverse control element is not subjected to the high relative torque. However, the challenge involved in providing this feature in the existing transmissions is the complex shaft arrangement. This problem arises due to the limitation of center distance between the two shafts and fixed axial dimensions due to the vehicle size limitations. Powershift transmission (planetary gear train transmission) and a continuously variable transmission (CVT)/Infinitely variable transmission (IVT) uses epicyclic gear train unit (planetary gear train) for enabling automatic transmission without the need for manual intervention. The usage of the epicyclic gear train unit (planetary gear train) for providing forward or reverse drive functionality to the powershift transmission (gearbox) and the continuously variable transmission (CVT)/Infinitely variable transmission (IVT is complex in design, and is difficult to assemble and service. The ring gear (internal gear) of the epicyclic gear train unit poses difficulties in manufacturing and incurs high manufacturing costs. The usage of internal gears in the epicyclic gear train unit leads to addition of many components in the gearbox which in turn incurs additional cost, and also increases an overall weight of the vehicle.

Therefore, there exists a need for a manual dual clutch power transmission unit for a vehicle, which obviates the aforementioned drawbacks.

SUMMARY

The principal object of an embodiment of this invention is to provide a manual dual clutch power transmission unit for a vehicle (tractor, constructional vehicle and the like).

Another object of an embodiment of this invention is to provide a manual dual clutch power transmission unit for a vehicle (tractor, constructional vehicle and the like), which comprises a hydro-mechanical operated a dual clutch unit (dual wet clutch), where the hydraulic dual clutch unit is mounted onto a separate shaft (called as wet clutch shaft).

Another object of an embodiment of this invention is to provide a manual dual clutch power transmission unit for a vehicle (tractor, constructional vehicle and the like), which comprises a synchro-shuttle transmission unit (forward/ reverse drive transmission), a multi-speed transmission unit (8 speed transmission unit) and a range transmission unit (3 ranges—low range, medium range and high range) thereby providing the vehicle with 24 forward speeds and 24 reverse speeds.

Another object of an embodiment of this invention is to provide a manual dual clutch power transmission unit for a vehicle (tractor, constructional vehicle and the like), which comprises a hydro-mechanical transmission control mechanism which controls shifting and selection of gears (odd gear and/or even gear) in the multi-speed transmission unit, and corresponding selection of clutches (odd clutch and/or even clutch) respectively in the hydraulic dual clutch unit (dual wet clutch) that are required for various driving conditions of the vehicle.

These and other objects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments of the invention are illustrated in the accompanying drawings, throughout which like reference letters indicate corresponding parts in the various figures. The embodiments herein will be better understood from the following description with reference to the drawings, in which.

DETAILED DESCRIPTION

Figure 1:
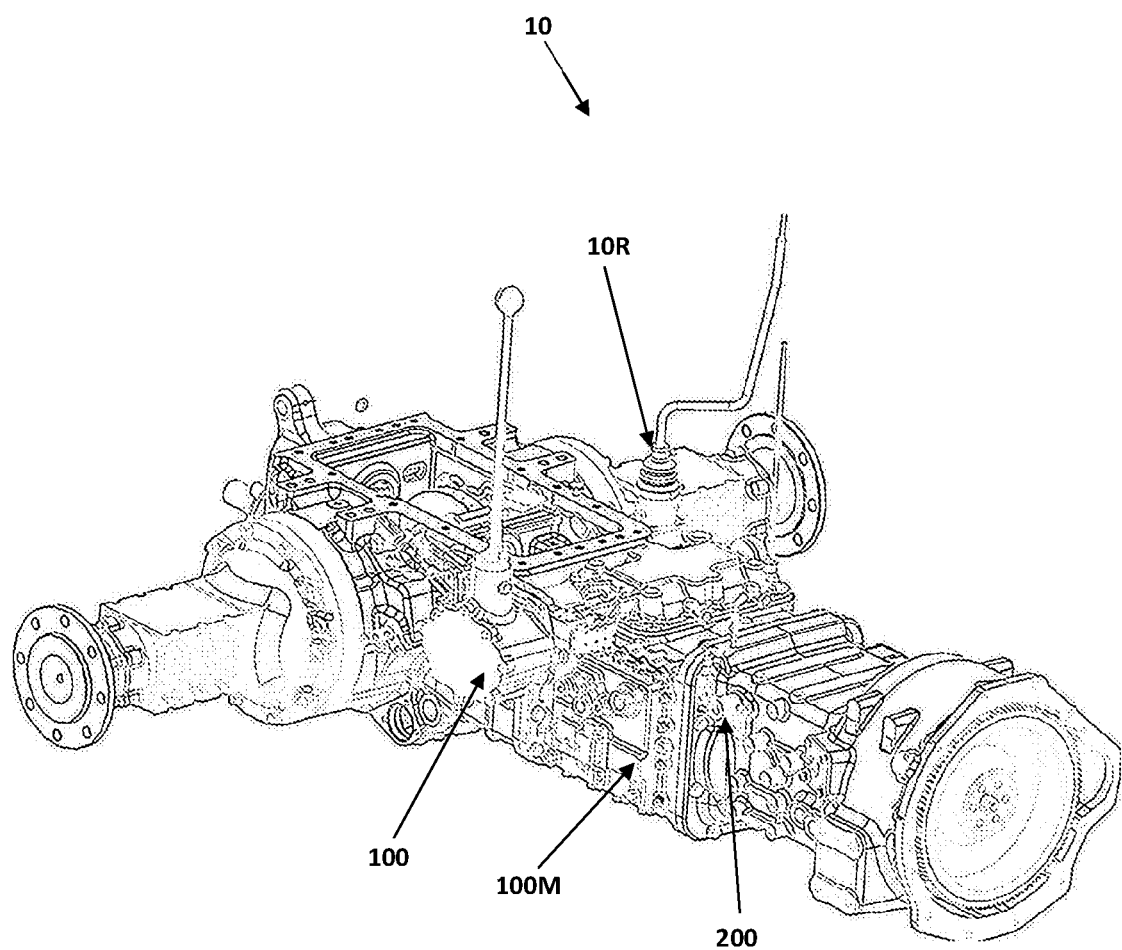
FIG. 1 depicts a perspective view of a manual dual clutch power transmission unit, according to an embodiment of the invention as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a manual dual clutch power transmission unit for a vehicle (tractor, constructional vehicle and the like), which comprises a synchro-shuttle transmission unit (forward/reverse drive transmission); a hydro-mechanical operated dual clutch unit (dual wet clutch), where the hydraulic dual clutch unit is mounted onto a separate shaft (called as wet clutch shaft); a multi-speed transmission unit (8 speed transmission unit); a range transmission unit (3 ranges—low range, medium range and high range) thereby providing the vehicle with 24 forward speeds and 24 reverse speeds; a hydro-mechanical transmission control mechanism which controls shifting and selection of gears (odd gear and/or even gear) in the multi-speed transmission unit and corresponding selection of clutches (odd clutch and/or even clutch) respectively in the hydraulic dual clutch unit; and an auxiliary transmission actuation mechanism (can be considered as tow start mechanism/manual transmission starting mechanism) which actuates the power transmission unit (drives an output shaft of the multi-speed transmission unit in the power transmission unit) therein to transmit the power from an engine to the wheels of the vehicle thereby propelling the vehicle when at least one of the hydraulic dual clutch unit (dual wet clutch) and a hydraulic system of the vehicle is not functioning or working, wherein the transmission control mechanism for the multi-speed transmission unit is provided with Z-gate sequential gear shift pattern having an upshift gate for upshifting gears and a downshift gate for downshifting gears. Referring now to the drawings, and more particularly to FIGS. 1 through 29, where similar reference characters denote corresponding features consistently throughout the figures, there are shown embodiments.

Figure 2:
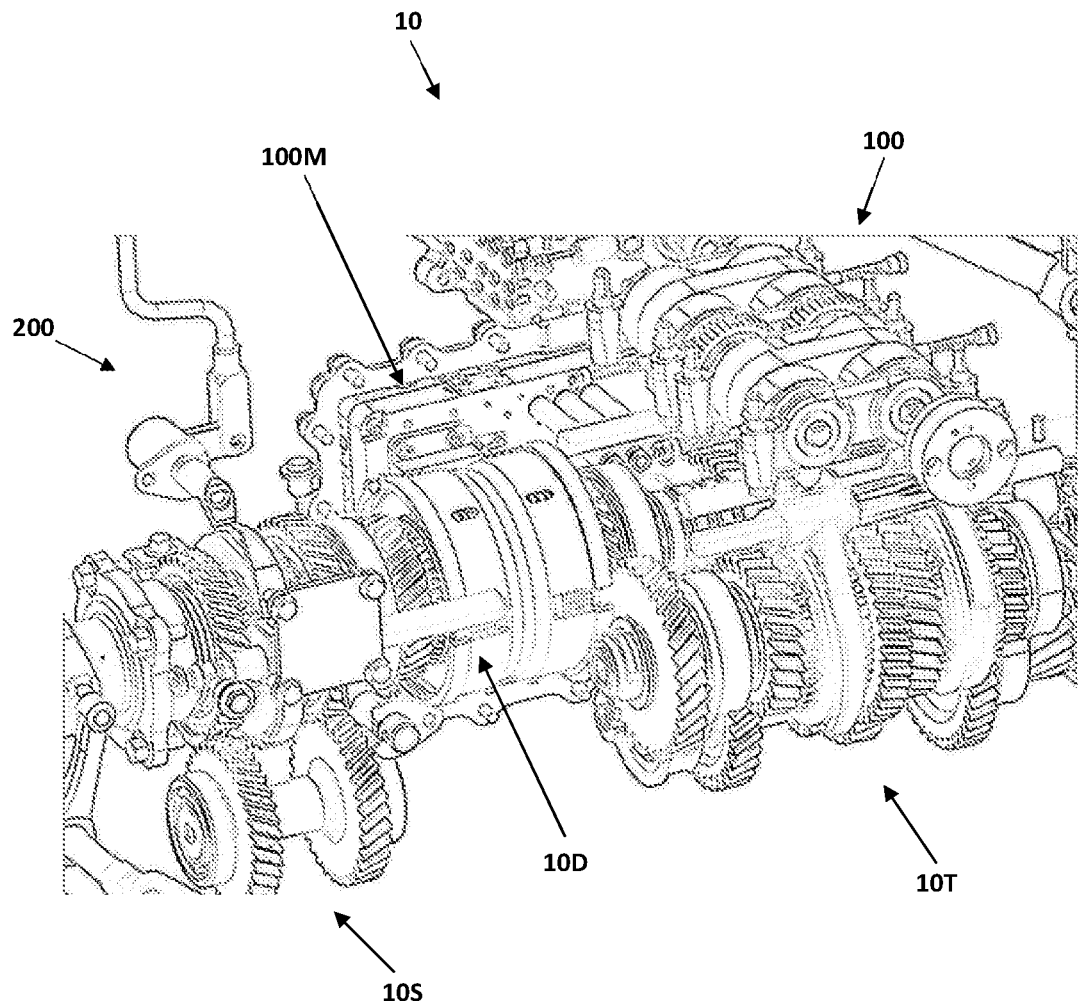
FIG. 2 depicts another perspective view of a manual dual clutch power transmission unit, according to an embodiment of the invention as disclosed herein.

FIG. 1 depicts a perspective view of a manual dual clutch power transmission unit, according to an embodiment of the invention as disclosed herein. FIG. 2 depicts another perspective view of a manual dual clutch power transmission unit, according to an embodiment of the invention as disclosed herein. In an embodiment, the manual dual clutch transmission unit 10 includes a main drive shaft 10M, a wet clutch shaft 10W, a synchro-shuttle transmission unit 10S, a dual clutch unit 10D, an odd shaft drive gear 10Xa, an odd shaft driven gear 10Xb, an even shaft drive gear 10Ya, an even shaft driven gear 10Yb, a multi-speed transmission unit 10T, a range transmission unit 10R, a transmission control mechanism 100, an auxiliary transmission actuation mechanism 200 and may include other standard components as present in a standard power transmission unit. For the purpose of this description and ease of understanding, the manual dual clutch power transmission unit 10 is explained herein below with reference to be provided in a tractor. However, it is also within the scope of the invention to implement/practice the components/mechanisms of the power transmission unit 10 in a constructional vehicle, a heavy-duty vehicle, an off-road vehicle and/or any other type of vehicle without otherwise deterring the intended function of the manual dual clutch power transmission unit 10 as can be deduced from the description and corresponding drawings.

Figure 3:
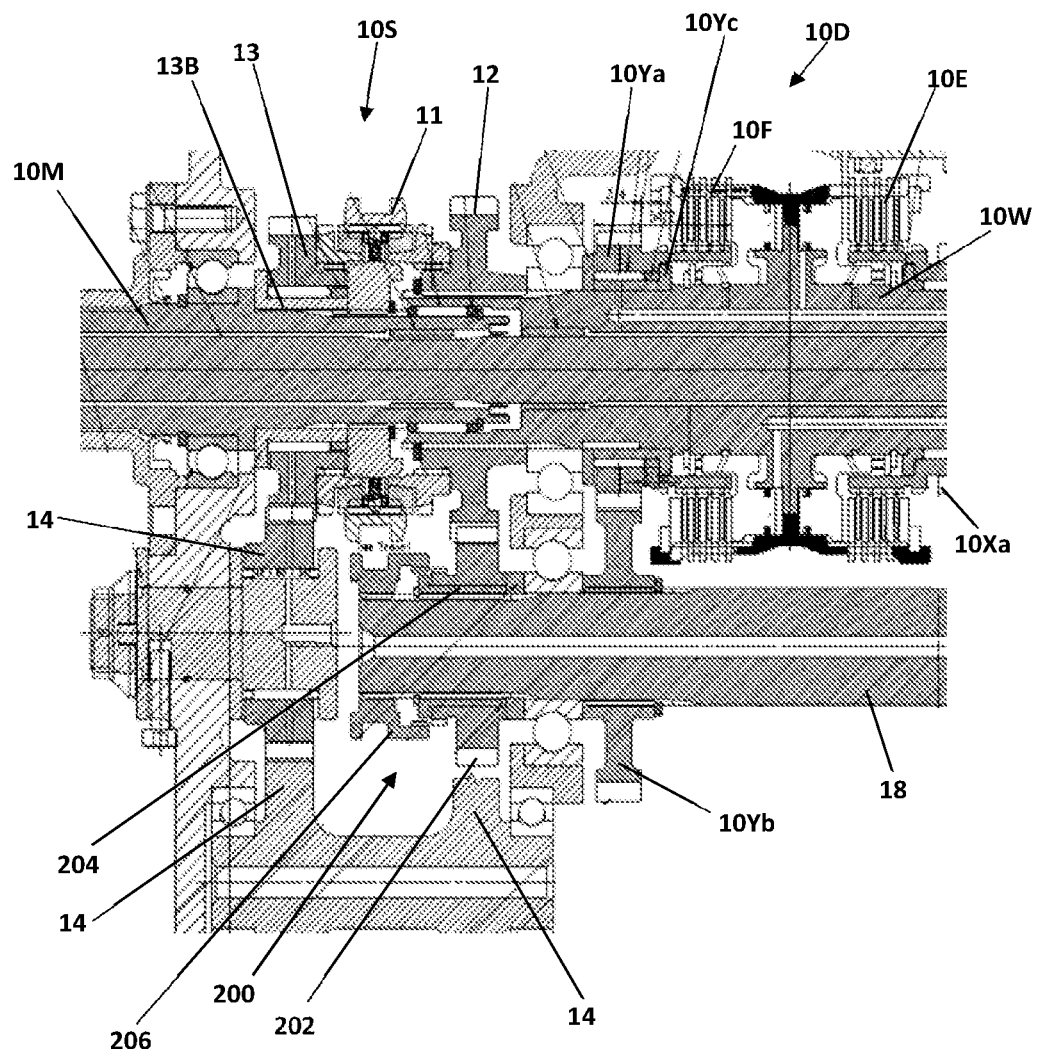
FIG. 3 depicts a cross-sectional view of a synchro-shuttle transmission unit, according to an embodiment of the invention as disclosed herein.

FIG. 3 depicts a cross-sectional view of a synchro-shuttle transmission unit 10S, according to an embodiment of the invention as disclosed herein. In one embodiment, the main drive shaft 10M is coupled to an engine of the vehicle. In another embodiment, the main drive shaft 10M is operatively coupled to the engine through a first clutch unit (not shown) of the power transmission unit. The main drive shaft 10M receives the power from the engine through the first clutch unit and the power from the main drive shaft 10M is transmitted to the dual clutch unit 10D through the synchro-shuttle transmission unit 10S. In an embodiment, the synchro-shuttle transmission unit 10S includes a forward and reverse synchronizer unit 11, a forward drive gear 12, a reverse drive gear 13, a reverse drive gear driven bush 13B, and a cluster of reverse idler gears 14. The forward and reverse synchronizer unit 11 is rotatably mounted onto the main drive shaft 10M at a predetermined position between the reverse drive gear 13 and the forward drive gear 12. The forward drive gear 12 is mounted onto the wet clutch shaft 10W at a predetermined position and immediately to the rear of the forward and reverse synchronizer unit 11. The forward drive gear 12 drives the wet clutch shaft 10W on engagement of the forward and reverse synchronizer unit 11 with at least one of the forward drive gear 12 and the reverse drive gear 13. The reverse drive gear 13 is mounted onto the main drive shaft 10M through a reverse drive gear driven bush 13B. The reverse drive gear 13 is rotatably connected to the forward drive gear 12 through the cluster of reverse idler gears 14.

The dual clutch unit 10D is mounted onto the wet clutch shaft 10W at a predetermined position between the even shaft drive gear 10Ya and the odd shaft drive gear 10Xa. The dual clutch unit 10D comprises an odd clutch unit 10E and an even clutch unit 10F.

The odd shaft drive gear 10Xa is mounted onto the wet clutch shaft 10W through an odd shaft drive gear driven bush 10Xc at a predetermined position, where the odd shaft drive gear 10Xa is disposed immediately to the rear of the odd clutch unit 10E of the dual clutch unit 10D. The odd shaft driven gear 10Xb is mounted onto an odd shaft 16 of the multi-speed transmission unit 16T at a predetermined position and rotatably connected to the odd shaft drive gear 10Xa. The odd shaft drive gear 10Xa is driven by the odd clutch unit 10E of the dual clutch unit 10D on actuation of the odd clutch unit 10E, and the odd shaft drive gear 10Xa in turn drives the odd shaft 16 through the odd shaft driven gear 10Xb thereby transmitting the power to the odd shaft 16.

The even shaft drive gear 10Ya is mounted onto the wet clutch shaft 10W through an even shaft drive gear driven bush 10Yc at a predetermined position, where the even shaft drive gear 10Ya is disposed immediately to the front of the even clutch unit 10F of the dual clutch unit 10D. The even shaft driven gear 10Yb is mounted to an even shaft 18 of the multi-speed transmission unit 10T at a predetermined position and rotatably connected to the even shaft drive gear 10Ya. The even shaft drive gear 10Ya is driven by the even clutch unit 10F of the dual clutch unit on actuation of the even clutch unit 10F, and the even shaft drive gear 10Ya in turn drives the even shaft 18 through even shaft driven gear 10Yb thereby transmitting the power to the even shaft 18.

Figure 4:
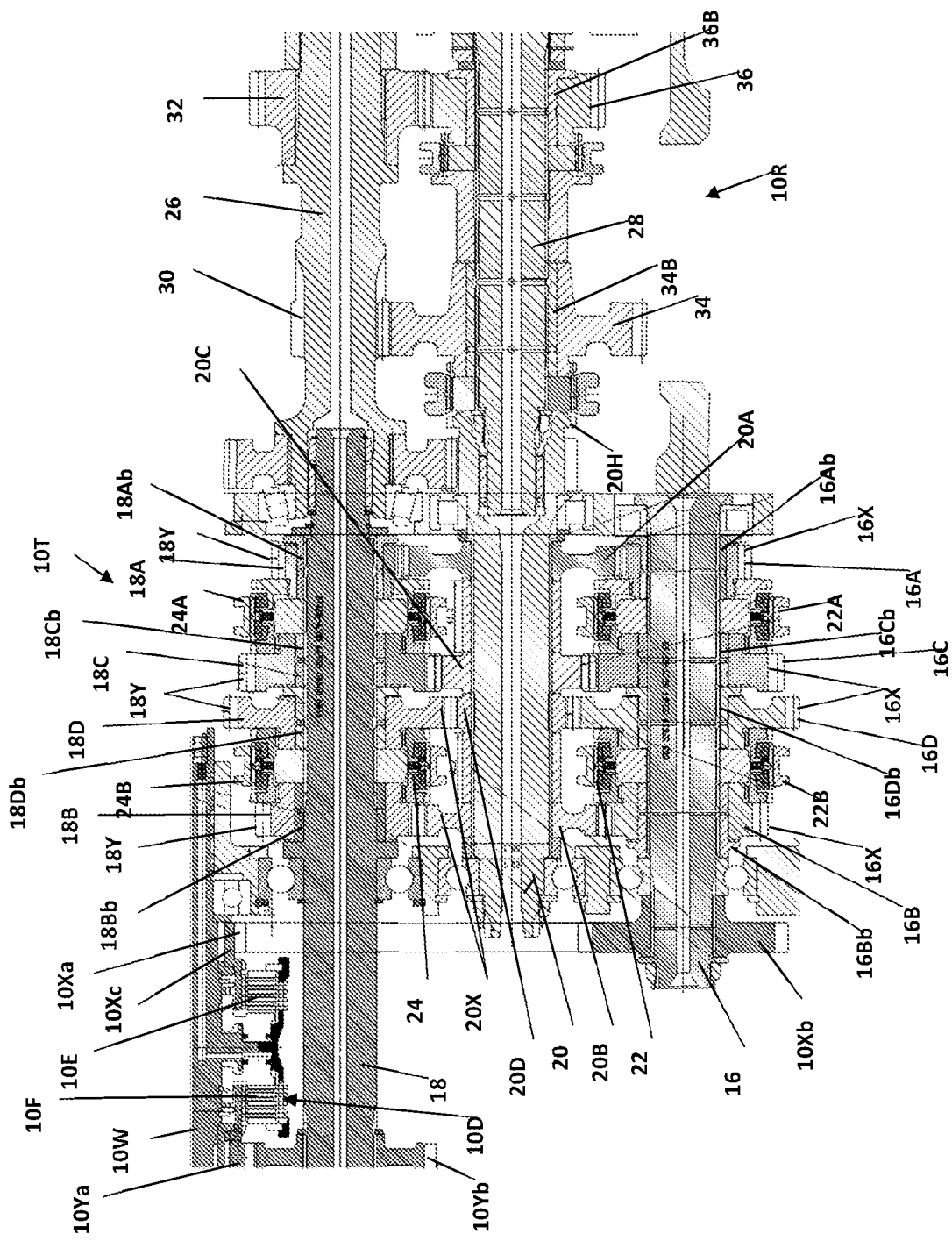
FIG. 4 depicts a cross-sectional view of a dual clutch unit, an even shaft drive gear, an odd shaft drive gear, and the wet clutch shaft in assembled condition, according to an embodiment of the invention as disclosed herein.

FIG. 4 depicts a cross-sectional view of a dual clutch unit, an even shaft drive gear, an odd shaft drive gear, and the wet clutch shaft in assembled condition, according to an embodiment of the invention as disclosed herein. In an embodiment, the multi-speed transmission unit 10T includes an odd shaft 16, an even shaft 18, an output shaft 20, a plurality of a plurality of odd drive gears 16X, a plurality of even drive gears 18Y, a plurality of driven gears 20X, a plurality of odd synchronizer units 22, a plurality of even synchronizers units 24 and may include other standard components as present in a standard transmission unit.

The plurality of odd drive gears 16X includes a first drive gear 16A (first speed drive gear), a third speed drive gear 16B (third speed drive gear), a fifth drive gear 16C (fifth speed drive gear) and a seventh drive gear 16D (seventh speed drive gear). The first drive gear 16A is mounted onto the odd shaft 16 through a first drive gear driven bush 16Ab at a predetermined position. The third drive gear 16B is mounted onto the odd shaft 16 through a third drive gear driven bush 16Bb at a predetermined position. The fifth drive gear 16C is mounted onto the odd shaft 16 through a fifth drive gear driven bush 16Cb at a predetermined position. The seventh drive gear 16D is mounted onto the odd shaft 16 through a seventh drive gear driven bush 16Db at a predetermined position.

The plurality of even drive gears 18Y includes a second drive gear 18A (second drive gear), a fourth drive gear 18B (fourth speed drive gear), a sixth speed drive gear 18C (sixth speed drive gear) and a eighth drive gear 18D (eighth speed drive gear). The second drive gear 18A is mounted onto the even shaft 18 through a second drive gear driven bush 18Ab at a predetermined position. The fourth drive gear 18B is mounted onto the even shaft 18 through a fourth drive gear driven bush 18Bb at a predetermined position. The sixth drive gear 18C is mounted onto the even shaft 18 through a sixth drive gear driven bush 18Cb at a predetermined position. The eighth drive gear 18D is mounted onto the even shaft 18 through an eighth drive gear driven bush 18Db at a predetermined position.

The plurality of driven gears 20X include a first and second driven gear 20A, a third and fourth driven gear 20B, a fifth and sixth driven gear 20C, and a seventh and eighth driven gear 20D. The first and second driven gear 20A is mounted onto the output shaft 20 at a predetermined position and rotatably connected to the first drive gear 16A and the second drive gear 18A. The third and fourth driven gear 20B is mounted onto the output shaft 20 at a predetermined position and rotatably connected to the third drive gear 16B and the fourth drive gear 18B. The fifth and sixth driven gear 20C is mounted onto the output shaft 20 at a predetermined position and rotatably connected to the fifth drive gear 16C and the sixth drive gear 18C. The seventh and eighth driven gear 20D is mounted onto the output shaft 20 at a predetermined position and rotatably connected to the seventh drive gear 16D and the eighth drive gear 18D.

The plurality of odd synchronizers units 22 include a first and fifth synchronizer unit 22A, and a third and seventh synchronizer unit 22B. The first and fifth synchronizer unit 22A is mounted onto the odd shaft 16 at a predetermined position between the first drive gear 16A and fifth drive gear 16C. The third and seventh synchronizer unit 22B is mounted onto the odd shaft 16 at a predetermined position between the third drive gear 16B and the seventh drive gear 16D.

The plurality of even synchronizers units 24 include a second and sixth synchronizer unit 24A, and a fourth and eighth synchronizer unit 24B. The second and sixth synchronizer unit 24A is mounted onto the even shaft 18 at a predetermined position between the second drive gear 18A and the sixth drive gear 18C. The fourth and eighth synchronizer unit 24B is mounted onto the even shaft 18 at a predetermined position between the fourth drive gear 18B and the eighth drive gear 18D.

The range transmission unit 10R includes a range drive gear 25, a range driving shaft 26, a range driven shaft 28, a low range drive gear 30, a medium range drive gear 32, a low range driven gear 34, a medium range driven gear 36 and a plurality of shifter sleeves 38. The range drive gear 25 is mounted onto the range driving shaft 26 at a predetermined position and rotatably connected to the output shaft 20 of the multi-speed transmission unit 10T. The low range drive gear 30 is integrated with the range driving shaft 26 at a predetermined position. The medium range drive gear 32 is mounted onto the range driving shaft 26 at a predetermined position. The low range driven gear 34 is mounted onto the range driven shaft 28 through a low range driven gear driven bush 34B at a predetermined position and rotatably connected to the low range drive gear 30. The medium range driven gear 36 is mounted onto the range driven shaft 28 through a medium range driven gear driven bush 36B at a predetermined position and rotatably connected to the medium range drive gear 32. The high range coupler 20H is integrated with the output shaft 20 of the multi-speed transmission unit 10T. The plurality of shifter sleeves 38 include a low and high range shifter sleeve 38H, and a medium range shifter sleeve 38M.

Figure 5:
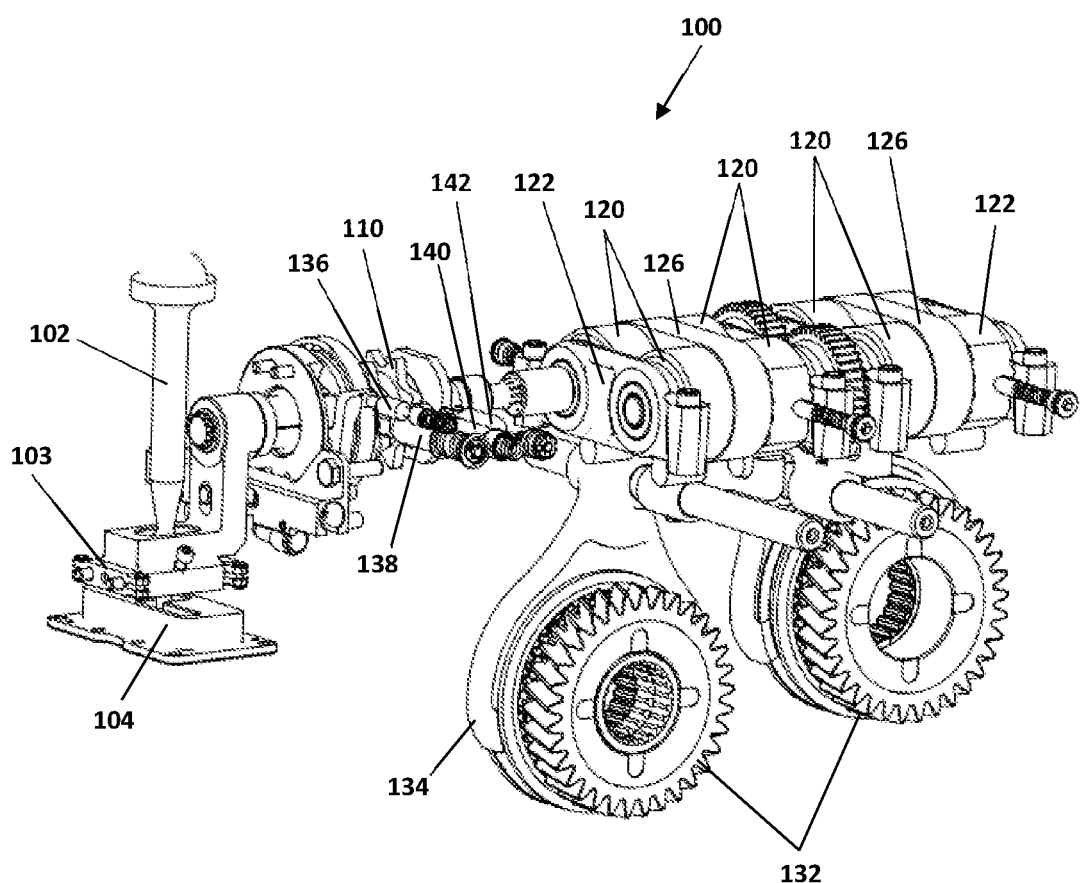
FIG. 5 depicts a perspective view of a transmission control mechanism, according to an embodiment of the invention as disclosed herein.

FIG. 5 depicts a perspective view of a transmission control mechanism, according to an embodiment of the invention as disclosed herein. In an embodiment, the transmission control mechanism 100 includes a transmission shift lever 102, a gear shift lever support arrangement 103, a shift gate element 104, a gear shift lever auto-return mechanism 105, a shifter arm 106, an input ratchet shifting assembly 108, an input shift ratchet and cam assembly 110, a drive shaft 112, a plurality of keys 113, a driven shaft 114, a coupler 115, a driven shaft drive gear 116, a driven shaft driven gear 118, a plurality of rail shifting means 120, a plurality of bushes 121, a plurality of rail shifter support members 122, a plurality of pawl assemblies 124, a plurality of pawl kicker means 126, a plurality of shift rails 128, a plurality of shift rail-ends 130, a plurality of synchronizers units 132, a plurality of shift forks 134, a lever position control valve assembly 136, an active detent control valve assembly 138, a detent control valve assembly 140, a clutch selection control valve assembly 142, a lever position valve lever 144 and a master clutch control valve assembly 100M.

In an embodiment, the transmission shift lever 102 is a mono-stable gear shift lever 102. The transmission shift lever 102 (gear shift lever) is operated by the operator (driver driving the vehicle) for controlling the shifting and selection of gears (even gear and/or odd gear) and corresponding clutches (odd clutch and/or even clutch) respectively which are required for various driving conditions of the vehicle. The transmission shift lever 102 (gear shift lever) is indirectly connected to the shifter arm 106 i.e., the transmission shift lever 102 (gear shift lever) is connected to the shifter arm 106 through the gear shift lever support arrangement 103. The transmission shift lever 102 is upshifted to preselect corresponding gear i.e., the transmission shift lever 102 is engaged by the operator to move the transmission shift lever 102 from a shift lever initial position towards a predefined direction (upward direction) for upshifting gears. The transmission shift lever 102 is downshifted to deselect corresponding gear thereby actuating corresponding previous gear i.e., the transmission shift lever 102 is engaged by the operator to move the transmission shift lever 102 from the shift lever initial position towards the predefined direction (downward direction) for downshifting gears. When the operator is pushing the transmission shift lever 102 (gear shift lever) away from his sitting position is called up shifting. Now, when the operator is pulling the transmission shift lever 102 (gear shift lever) towards his driver seating is termed as down shifting. The transmission shift lever 102 is provided with a Z-gate sequential gear shift pattern.

Figure 6:
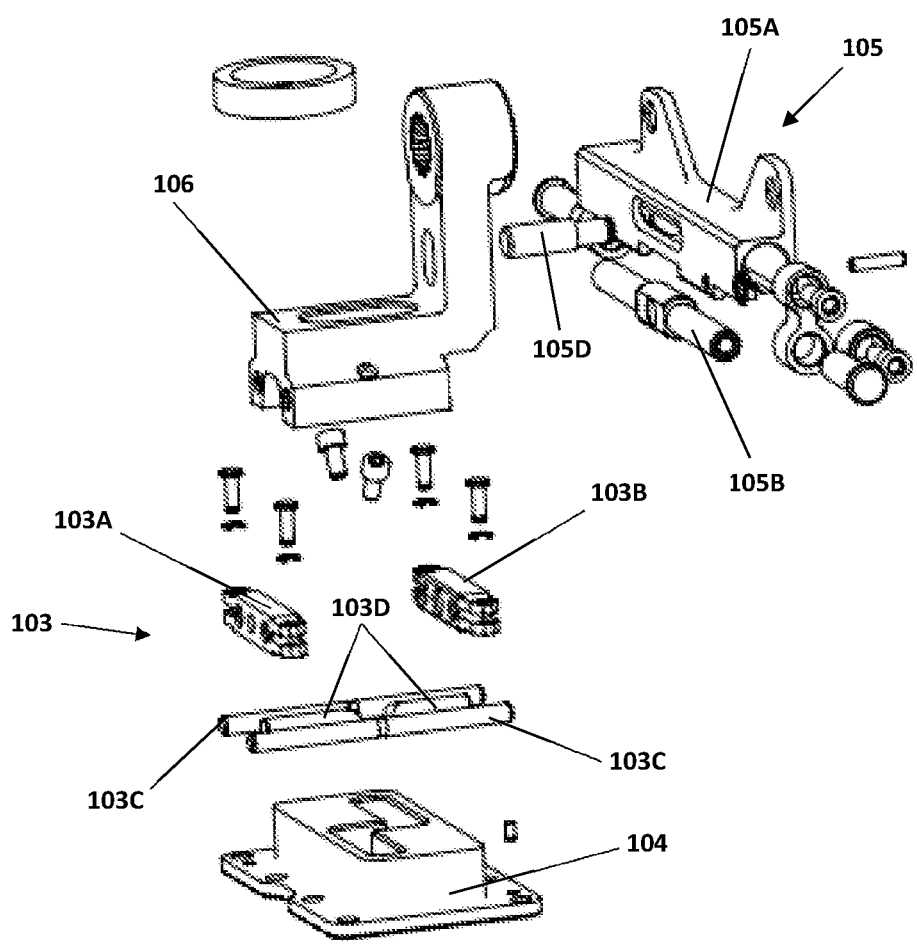
FIG. 6 depicts a perspective view of a portion of the transmission control mechanism, according to an embodiment of the invention as disclosed herein.

FIG. 6 depicts a perspective view of a portion of the transmission control mechanism, according to an embodiment of the invention as disclosed herein. The gear shift lever support arrangement 103 is used for supporting the transmission shift lever 102 (gear shift lever). The gear shift lever support arrangement 103 includes a first support means 103A, a second support means 103B, a plurality of locking pins 103C, a plurality of center locking pins 103D and a plurality of fasteners.

Figure 9:
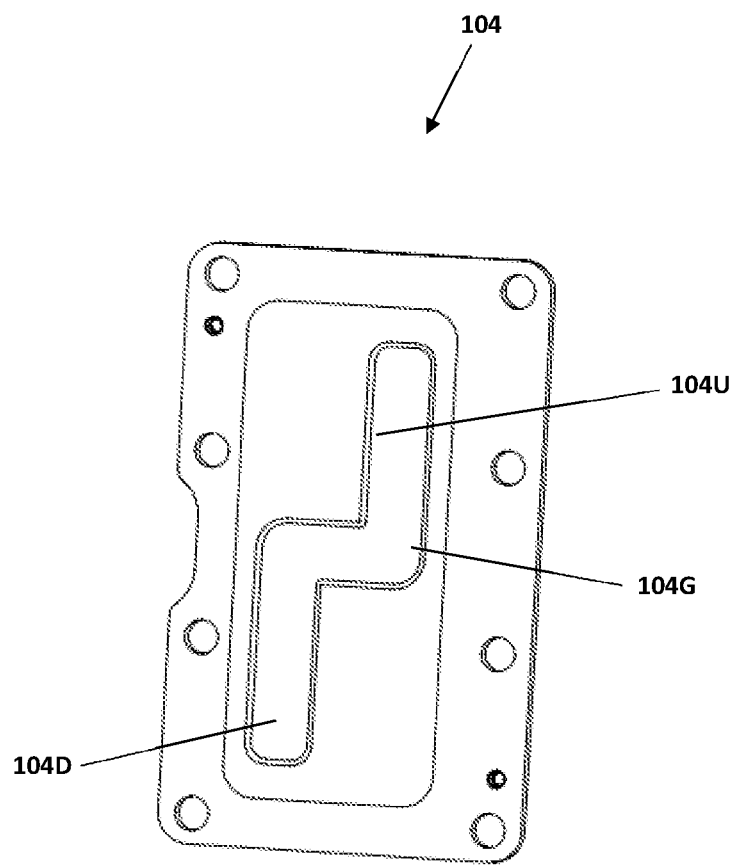
FIG. 9 depicts a perspective view of a shift gate element of the transmission control mechanism, according to an embodiment of the invention as disclosed herein.

FIG. 9 depicts a perspective view of a shift gate element of the transmission control mechanism, according to an embodiment of the invention as disclosed herein. The shift gate element 104 includes a shift gate 104G. The shift gate 104G of the shift gate element 104 defines an upshift gate 104U and a downshift gate 104D. The upshift gate 104U of the shift gate 104G is adapted to facilitate (enable) upshift movement of the transmission shift lever 102. The downshift gate 104D of the shift gate 104G is adapted to facilitate (enable) downshift movement of the transmission shift lever 102 (gear shift lever). The upshift gate 104U and the downshift gate 104D of the shift gate 104G defines a shift lever initial position in between each other. The shift gate 104G of the shift gate element 104 substantially defines a Z-gate shift pattern (Z-gate sequential gear shift pattern).

Figure 7:
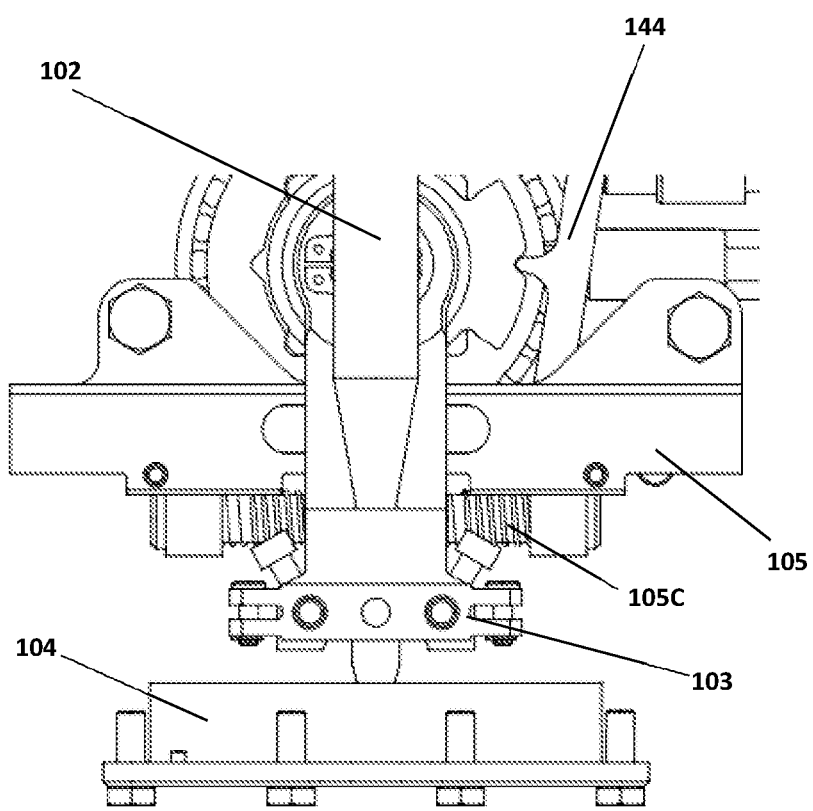
FIG. 7 depicts a perspective view of another portion of the transmission control mechanism, according to an embodiment of the invention as disclosed herein.

FIG. 7 depicts a perspective view of another portion of the transmission control mechanism, according to an embodiment of the invention as disclosed herein. The gear shift lever auto-return mechanism 105 is used to move (return) the transmission shift lever 102 (gear shift lever) automatically to its initial position (original position) on dis-engagement of the transmission shift lever 102 (gear shift lever) during upshifting and downshifting to corresponding gear. The gear shift lever auto-return mechanism 105 includes a housing 105A, a movable member 105B (can be considered as piston), a spring 105C, a rod 105D.

Figure 8:
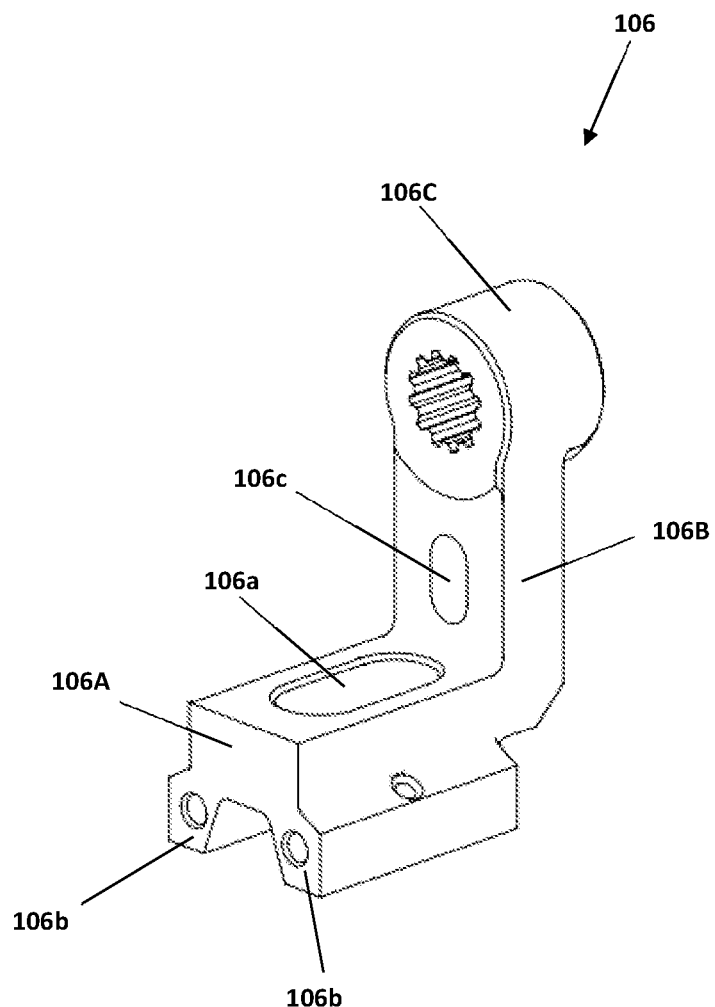
FIG. 8 depicts a perspective view of a shifter arm of the transmission control mechanism, according to an embodiment of the invention as disclosed herein.

FIG. 8 depicts a perspective view of a shifter arm of the transmission control mechanism, according to an embodiment of the invention as disclosed herein. The shifter arm 106 is used to move in a predefined direction (clockwise direction or anti-clockwise direction) therein to move the input ratchet shifting assembly 108 on movement of the transmission shift lever 102 (gear shift lever) towards a predefined direction (can be considered as upshift or downshift movement of the transmission shift lever 102). The shifter arm 106 is movably connected to the transmission shift lever 102 (gear shift lever) through the gear shift lever support arrangement 103. The shifter arm 106 is adapted to connect the transmission shift lever 102 (gear shift lever) to the input ratchet shifting assembly 108 thereby transferring the movement of the transmission shift lever 102 to the input ratchet shifting assembly 108. The shifter arm 106 includes a base 106A, a first portion 106B and a second portion 106C. The base 106A of the shifter arm 106 defines a lever receiving portion 106*a* and a plurality of legs 106*b*. The lever receiving portion 106*a* of the base 106A of the shifter arm 106 is adapted to receive corresponding portion of the transmission shift lever 102 (gear shift lever). The plurality of legs 106*b* of the base 106A is adapted to extend from the base 106A in a downward direction along the lengthwise direction of the base 106A and spaced away from each other, where one leg 106*b* is parallel to the other leg 106*b* of the base 106A of the shifter arm 106. The first portion 106F of the shifter arm 106 is transversely extending from the base 106A of the shifter arm 106. The first portion 106B of the shifter arm 106 defines a rod receiving portion 106*c* adapted to receive corresponding portion of the rod 105D of the gear shift lever auto-return mechanism 105. The second portion 106C of the shifter arm 106C is disposed above the first portion 106B of the shifter arm 106. The second portion 106C of the shifter arm 106 defines a plurality of internal teeth (internal splines) adapted to provide rotatable connection for the input ratchet shifting assembly 108.

Figure 10:
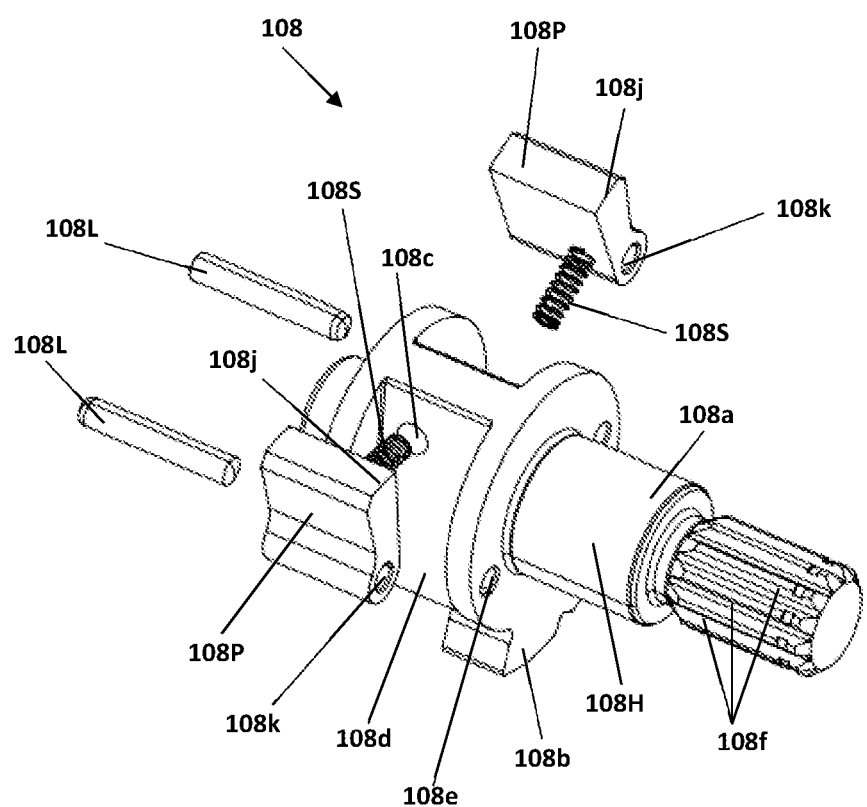
FIG. 10 depicts a perspective view of an input ratchet shifting assembly of the transmission control mechanism, according to an embodiment of the invention as disclosed herein.
Figure 11:
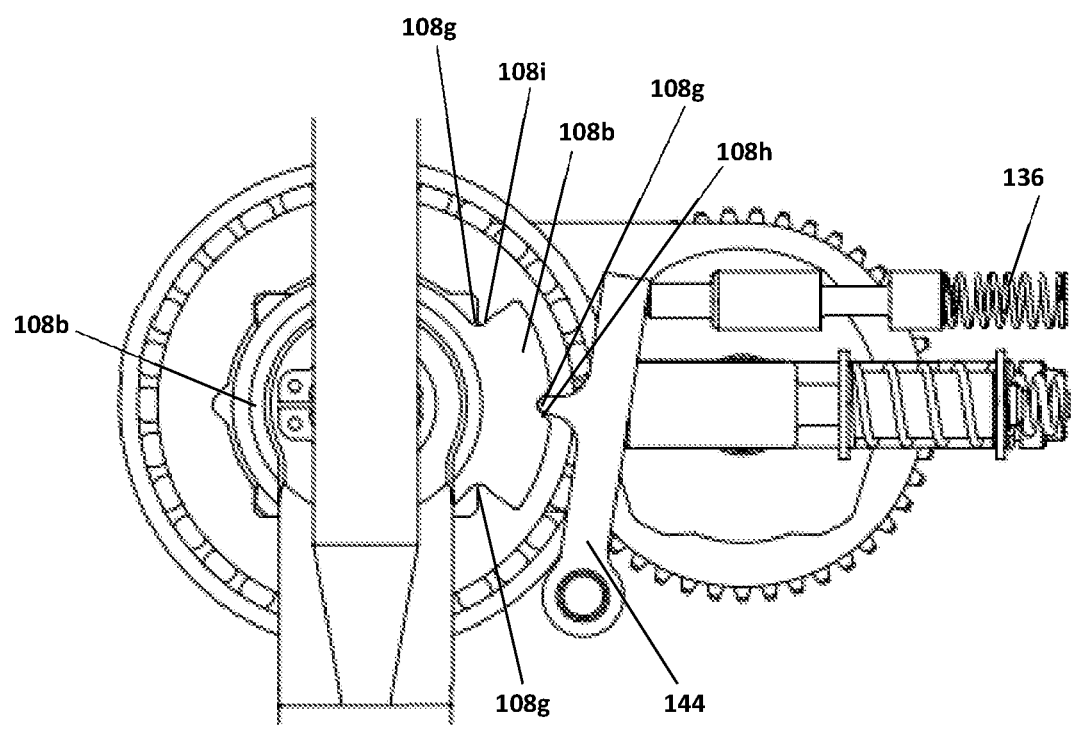
FIG. 11 depicts a perspective view of another portion of the transmission control mechanism, according to an embodiment of the invention as disclosed herein.

FIG. 10 depicts a perspective view of an input ratchet shifting assembly of the transmission control mechanism, according to an embodiment of the invention as disclosed herein. FIG. 11 depicts a perspective view of another portion of the transmission control mechanism, according to an embodiment of the invention as disclosed herein. The input ratchet shifting assembly 108 is used to move/shift the input shift ratchet and cam assembly 110 in response to the movement of the shifter arm 106 along a predefined direction which occurs due to the movement of the transmission shift lever 102 (gear shift lever) towards a predefined direction (can be considered as upshift or downshift movement of the transmission shift lever 102). In an embodiment, the input ratchet shifting assembly 108 includes a pawl housing 108H, a plurality of pawls 108P, a plurality of resilient means 108S and a plurality of pawl locking elements 108L. In an embodiment, the pawl housing 108H defines a shaft 108*a*, a gear shift lever position cam 108*b*, a plurality of resilient member receiving portions 108*c*, a plurality of pawl receiving portions 108*d* and a plurality of pawl locking member receiving portions 108*e*. The shaft 108*a* of the pawl housing 108H is adapted to extend in a direction towards the second portion 106C of the shifter arm 106. The shaft 108*a* of the pawl housing 108H of the input ratchet shifting assembly 108 is movably (rotatably/turnably) connected to the second portion 106C of the shifter arm 106. The shaft 108*a* of the pawl housing 106H defines a plurality of external teeth 108*f* (external splines) provided at a predetermined position (can be considered as one end of the shaft 106*s* of the pawl housing 102 which is adjacent to the shifter arm 106). The plurality of external teeth 108*f* (external splines) of the shaft 106*s* of the pawl housing 108H is adapted to engage corresponding plurality of internal teeth (internal teeth) of the second portion 106C of the shifter arm 106 thereby movably (rotatably/turnably) connecting the input ratchet shifting assembly 108 to the shifter arm 106. The gear shift lever position cam 108*b* of the pawl housing 108H defines a plurality of gear position portions 108*g* (can be considered as gear position detent). The plurality of gear position portions of the gear shift lever position cam 108*b* include an odd gear position portion 108*h* (odd gear position detent) and an even gear position portion 108*i* (even gear position detent). Each gear position portion of the gear shift lever position cam 108*b* of the pawl housing 108H can be considered to be a detent or an undercut. Each resilient member receiving portion 108*c* of the pawl housing 108H is adapted to receive a portion of corresponding resilient means 108S. Each resilient member receiving portion 108*c* of the pawl housing 108H can be considered to be a cavity. Each pawl receiving portions 108*d* of the pawl housing 108H is adapted to receive corresponding pawl 108P. Each pawl locking member receiving portion 108e of the pawl housing 108H is adapted to receive corresponding pawl locking element 108L therein to engage corresponding pawl 108P with pawl housing 108H at a predetermined position. Each pawl locking member receiving portion 108e of the pawl housing 108H can be considered to be a hole (opening). Each pawl 108P of the input ratchet shifting assembly 108 is received by corresponding pawl receiving portion 108d of the pawl housing 108H. Each pawl 108P is loaded (spring loaded) to the pawl housing 108H. Each pawl 108P defines a locking portion 108j and a locking member receiving portion 108k. The locking member receiving portion 108k of each pawl 108P is adapted to receive corresponding pawl locking element 108L therein to connect each pawl 108P to the pawl housing 108H. The locking member receiving portion 108k of each pawl 108P can be considered to be a hole (opening). At least a portion of each resilient means 108S of the input ratchet shifting assembly 108 is received by corresponding resilient member receiving portions 108c of the pawl housing 108H. A portion of at least one resilient means 108S of the input ratchet shifting assembly 108 is disposed external to corresponding resilient member receiving portion 108c of the pawl housing 108H when corresponding gear (odd or even gear) is in engaged position. Each pawl locking elements 108L of the input ratchet shifting assembly 108 is adapted to be received by corresponding pawl locking member receiving portion 108e the pawl housing 108H there through to enable each pawl locking element 108L to be received by corresponding locking member receiving portion 108k of corresponding pawl 108P thereby facilitating engagement of corresponding pawl 108P with the pawl housing 108H of the input ratchet shifting assembly 108. Each pawl locking elements 108L of the input ratchet shifting assembly 108 can be considered to be a locking pin. It is also within the scope of the invention to provide the input ratchet shifting assembly 108 with any other type of locking means to enable engagement of each pawl 108P with the pawl housing 108H of the input ratchet shifting assembly 108.

Figure 12:
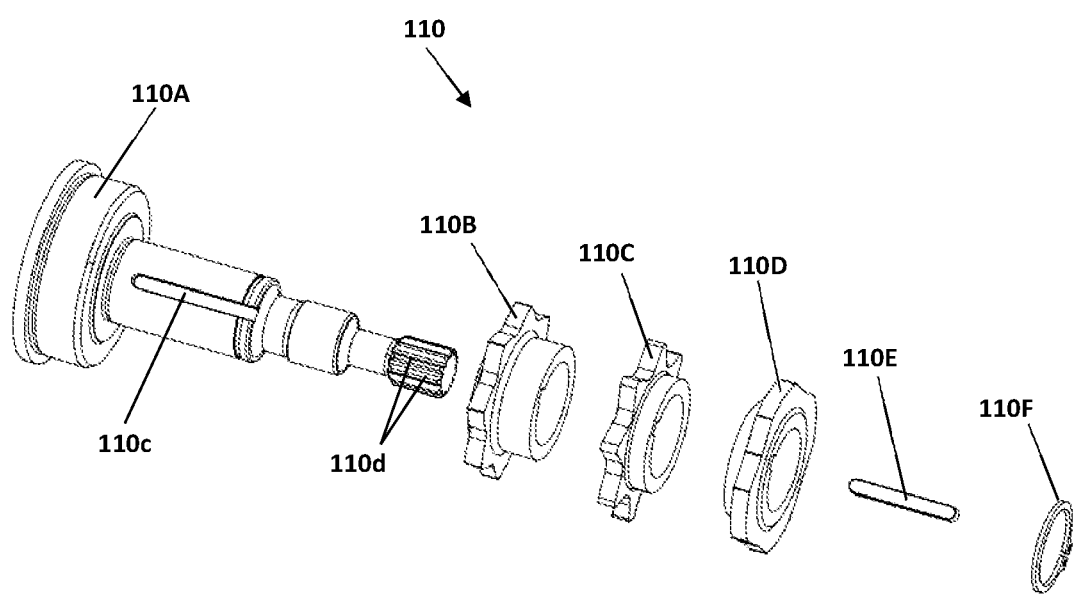
FIG. 12 depicts an exploded view of an input shift ratchet and cam assembly of the transmission control mechanism, according to an embodiment of the invention as disclosed herein.
Figure 13:
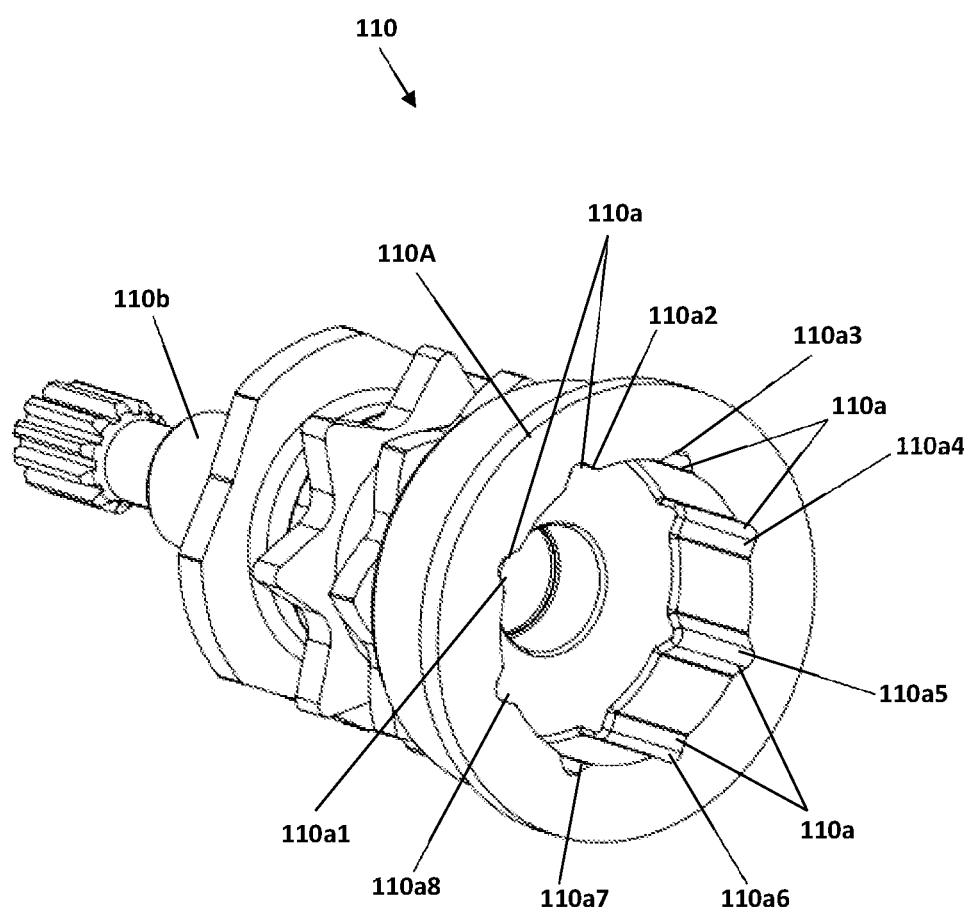
FIG. 13 depicts a perspective view of an input shift ratchet and cam assembly of the transmission control mechanism, according to an embodiment of the invention as disclosed herein.
Figure 14:
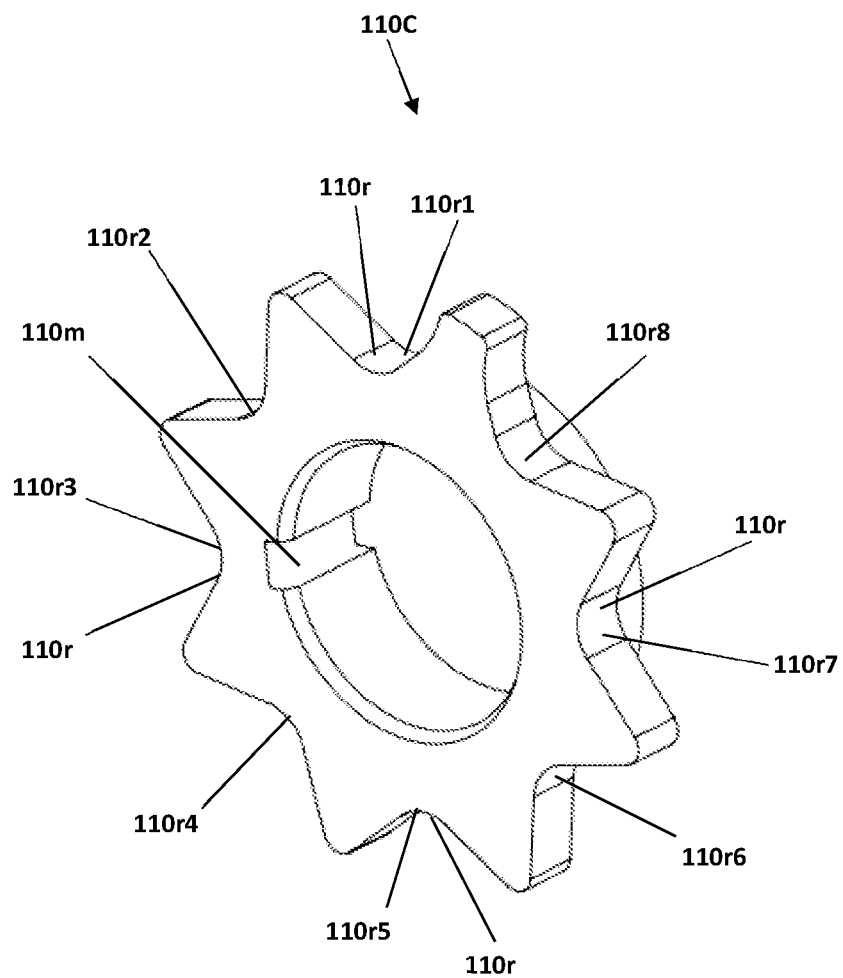
FIG. 14 depicts a perspective view of an active detent cam input shift ratchet and cam assembly of the transmission control mechanism, according to an embodiment of the invention as disclosed herein.
Figure 15:
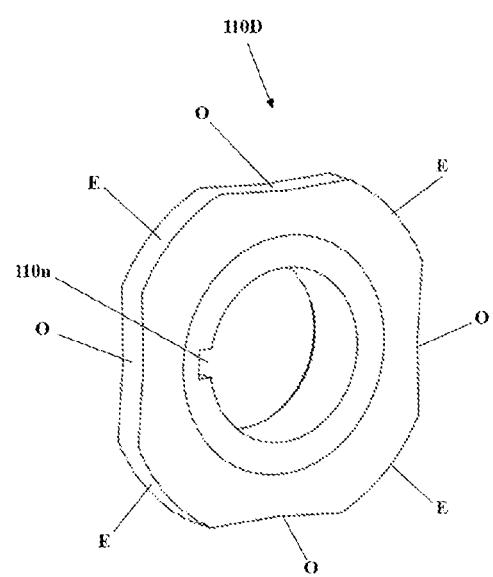
FIG. 15 depicts a perspective view of a rotary detent cam of the input shift ratchet and cam assembly, according to an embodiment of the invention as disclosed herein.

FIG. 12 depicts an exploded view of an input shift ratchet and cam assembly of the transmission control mechanism, according to an embodiment of the invention as disclosed herein. FIG. 13 depicts a perspective view of an input shift ratchet and cam assembly of the transmission control mechanism, according to an embodiment of the invention as disclosed herein. In an embodiment, the input shift ratchet and cam assembly 110 includes a shift ratchet 110A, an active detent cam 110B, a rotary detent cam 110C, a clutch selection cam 110D, a key 110E and a circlip 110F. In an embodiment, the shift ratchet 110A of the input shift ratchet and cam assembly 110 defines a plurality of pawl locking portions 110a and a shaft 110b. Each pawl locking portion 110a of the shift ratchet 110A is adapted to be engaged by the locking portion 108j of at least one pawl 108P of the input ratchet shifting assembly 108 therein to move (rotate/turn) the shift ratchet 110A which in turn moves (rotates/turns) at least one of the active detent cam 110B, the rotary detent cam 110C, the clutch selection cam 110D and the drive shaft 112 in response to the movement (rotation/turning) of the input ratchet shifting assembly 108 at the predefined angle due to movement (rotation/turning) of the shifter arm on engagement of the transmission shift lever 102 adapted to be upshifted or downshifted to select corresponding gear. The plurality of pawl locking portions 110a of the shift ratchet 110A includes a first gear position pawl locking portion 110a1, a second gear position pawl locking portion 110a2, third gear position pawl locking portion 110a3, a fourth gear position pawl locking portion 110a4, a fifth gear position pawl locking portion 110a5, a sixth gear position pawl locking portion 110a6, a seventh gear position pawl locking portion 110a7 and an eighth gear position pawl locking portion 110a8. In an embodiment, the plurality of pawl locking portions 110a can be considered to be a plurality of internal teeth (splines). The shaft 110b of the shift ratchet 110A is adapted to extend in a direction towards the drive shaft 112. The shaft 110b of the shift ratchet 110A defines a key seating portion 110c and a plurality of external teeth 110d (external splines), which are provided at corresponding predetermined positions. The key seating portion 110c of the shaft 110b of the shift ratchet 110A is adapted to extending along the lengthwise direction of the shaft 110b between the active detent cam 110B and the clutch selection cam 110D. The key seating portion 110c of the shaft 110b of the shift ratchet 110A is adapted to receive a portion of the key 110E therein to facilitate mounting of the active detent cam 110B, the rotary detent cam 110C and the clutch selection cam 110D. The shaft 110b of the shift ratchet 110A is rotatably connected to the drive shaft 112 through the coupler 115. The plurality of external teeth 110d of the shaft 110b of the shift ratchet 110A is provided at a predetermined position (can be considered as the end of the shaft 110b of the shift ratchet 110A which is adjacent to the coupler 115). The plurality of external teeth 110d of the shaft 110b of the shift ratchet 110A is adapted to engage corresponding plurality of internal teeth 115I (internal splines) of the coupler 115 therein to drive the drive shaft 112 on movement of the shift ratchet 110A during upshifting or downshifting to select corresponding gear. The active detent cam 110B is key fitted to the shaft 110b of the shift ratchet 110A at a predetermined position. FIG. 14 depicts a perspective view of an active detent cam input shift ratchet and cam assembly of the transmission control mechanism, according to an embodiment of the invention as disclosed herein. The active detent cam 110B is adapted to be engaged by a cam follower of the active detent control valve assembly 138 therein to move the active detent cam 110B therein to facilitate de-actuation of corresponding gear which occurs after upshifting to preselect corresponding gear. In an embodiment, the active detent cam 110B defines a plurality of gear position portions 110a (can be considered as gear position detent). The plurality of gear position portions 110a of active detent cam 110B includes a first gear position portion 110a1, a second gear position portion 110a2, a third gear position portion 110a3, a fourth gear position portion 110a4, a fifth gear position portion 110a5, a sixth gear position portion 110a6, a seventh gear position portion 110a7 and an eighth gear position portion 110a8. In an embodiment, the plurality of gear position portions 110a of the active detent cam 110B can be considered to be a detent or an undercut. The active detent cam 110B defines a keyway 110k adapted to receive corresponding portion of the key E therein to facilitate mounting of the active detent cam 110B onto the shift ratchet 110A at the predetermined position. FIG. 15 depicts a perspective view of a rotary detent cam of the input shift ratchet and cam assembly, according to an embodiment of the invention as disclosed herein. The rotary detent cam 110C is key fitted to the shaft 110b of the shift ratchet 110A at a predetermined position. The rotary detent cam 110C is adapted to move a cam follower 140f of the detent control valve assembly 140. In an embodiment, the rotary detent cam 110C defines a plurality of gear position portions 110r (can be considered as gear position detent). The plurality of gear position portions 110r of rotary detent cam 110C includes a first gear position portion 110r1, a second gear position portion 110*r*2, a third gear position portion 110*r*3, a fourth gear position portion 110*r*4, a fifth gear position portion 110*r*, a sixth gear position portion 110*r*6, a seventh gear position portion 110*r*7 and an eighth gear position portion 110*r*8. In an embodiment, the plurality of gear position portions 110*r* of the rotary detent cam 110B can be considered to be a detent or an undercut. The rotary detent cam 110C defines a keyway 110*m* adapted to receive corresponding another portion of the key E therein to facilitate mounting of the rotary detent cam 110C onto the shift ratchet 110A at the predetermined position. The clutch selection cam 110D is key fitted to the shaft 110*b* of the shift ratchet 110A at a predetermined position. The clutch selection cam 110D is adapted to move a cam follower 142*f* of the clutch selection control valve assembly 142. In an embodiment, the clutch selection cam 110D defines a plurality of odd gear position peripheral portions O and a plurality of even gear position peripheral portions E. In an embodiment, each odd gear position peripheral portion O of the clutch selection cam 110D substantially defines an arc shape configuration. In an embodiment, each odd gear position peripheral portion O of the clutch selection cam 110D substantially defines an arc shape configuration. The clutch selection cam 110D defines a keyway 110*n* adapted to receive corresponding another portion of the key E therein to facilitate mounting of the clutch selection cam 110D onto the shift ratchet 110A at the predetermined position. The circlip 110F is used to restrict the axial (linear) movement of the active detent cam 110B, the rotary detent cam 110C and the clutch selection cam 110D.

Figure 16:
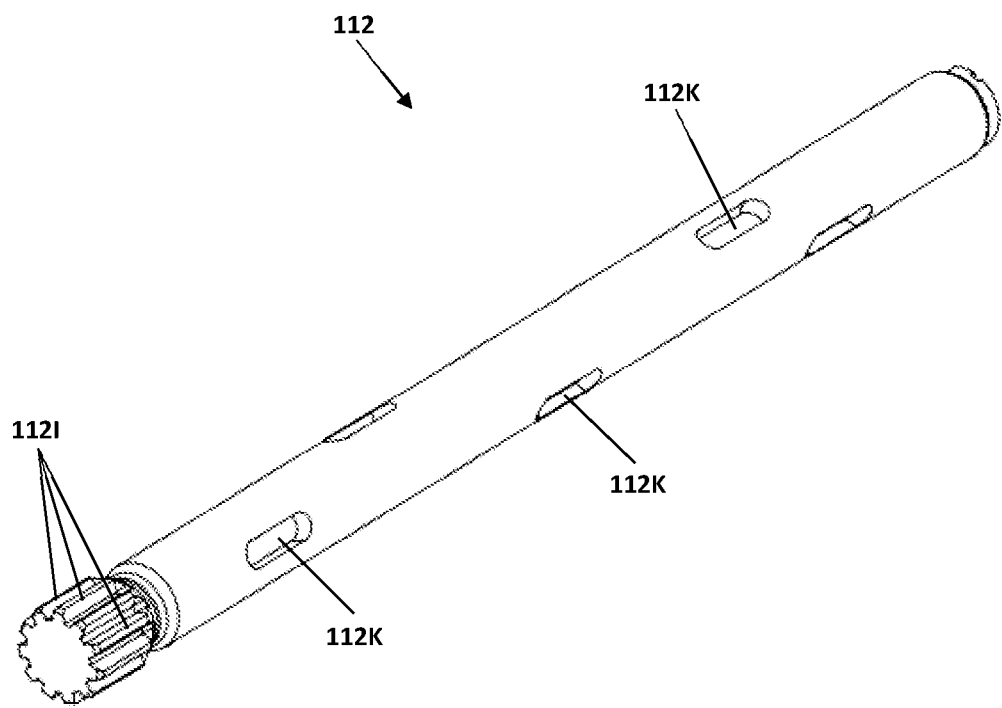
FIG. 16 depicts a perspective view of a drive shaft, according to an embodiment of the invention as disclosed herein.
Figure 18:
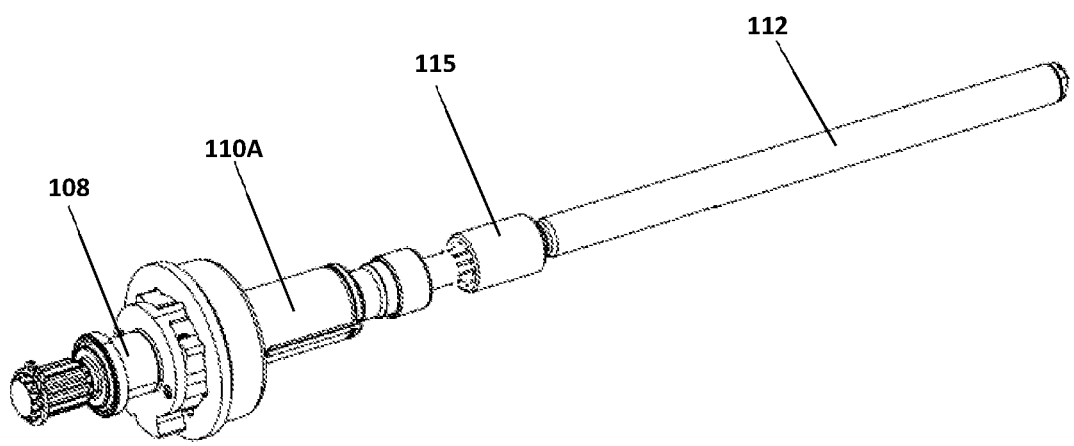
FIG. 18 depicts a perspective view of the input ratchet shifting assembly, the drive shaft and a coupler in assembled condition, according to an embodiment of the invention as disclosed herein.

FIG. 16 depicts a perspective view of a drive shaft, according to an embodiment of the invention as disclosed herein. FIG. 18 depicts a perspective view of the input ratchet shifting assembly, the drive shaft and a coupler in assembled condition, according to an embodiment of the invention as disclosed herein. The drive shaft 112 is rotatably connected to the shaft 110*b* of the shift ratchet 110A of the input shift ratchet and cam assembly 110 through the coupler 115 i.e., the drive shaft 112 is driven by the shaft 110*b* of the shift ratchet 110A of the input shift ratchet and cam assembly 110 through the coupler 115. The drive shaft 112 defines a plurality of external teeth 112I (internal splines) provided at a predetermined position (can be considered as the end of the drive shaft 112 which is adjacent to the coupler 115. The plurality of external teeth 112I (internal splines) of the drive shaft 112 is adapted to engage corresponding plurality of internal teeth 115I (internal splines) of the coupler 115. The drive shaft 112 defines a plurality of key seating portions 112K provided at corresponding predetermined positions (angles). Each key seating portions 112K of the drive shaft 112 is adapted to receive a portion of corresponding key 113 therein to facilitate rotatable mounting of corresponding pawl assembly 124. The drive shaft 112 is used to drive the driven shaft 114 through the driven shaft drive gear 116 and the driven shaft driven gear 118 i.e., the drive shaft 112 drives the driven shaft drive gear 116 therein to drive the driven shaft 114 through the driven shaft driven gear 118. The drive shaft 112 is adapted to drive at least one corresponding pawl assembly 124 therein to move corresponding rail shifting means 120 to move corresponding shift rail 130 in a predefined direction to enable movement of corresponding shift fork 132 and corresponding synchronizer unit 134 to corresponding gear position in a direction towards corresponding gear thereby facilitating pre-selection of corresponding gear on movement of the shifter arm 106 in a predefined direction and at a predefined angle during upshifting of the transmission shift lever 102 to corresponding gear pre-selection position.

Figure 17:
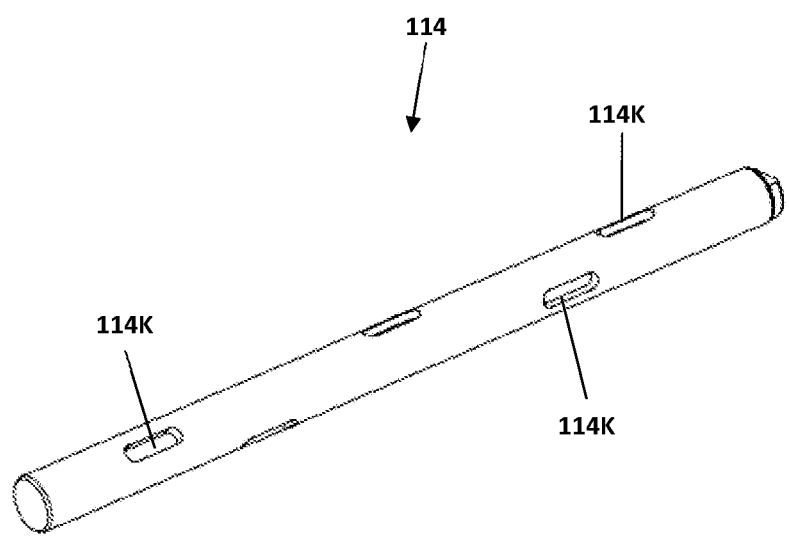
FIG. 17 depicts a perspective view of a driven shaft, according to an embodiment of the invention as disclosed herein.

FIG. 17 depicts a perspective view of a driven shaft, according to an embodiment of the invention as disclosed herein. The driven shaft 114 is driven by the drive shaft 112 through the driven shaft driven gear 118 and the driven shaft drive gear 116. The driven shaft 114 is rotatably connected to the drive shaft 112. The driven shaft 114 defines a plurality of key seating portions 114K provided at corresponding predetermined positions (angles). Each key seating portion 114K of the driven shaft 114 is adapted to receive a portion of corresponding key 113 therein to facilitate rotatable mounting of corresponding pawl assembly 124. The driven shaft 114 is adapted to drive at least one corresponding pawl assembly 124 therein to move corresponding rail shifting means 120 to move corresponding shift rail 130 in a predefined direction to enable movement of corresponding shift fork 132 and corresponding synchronizer unit 134 to corresponding gear position in a direction towards corresponding gear thereby facilitating pre-selection of corresponding gear on movement of the shifter arm 106 in a predefined direction and at a predefined angle during upshifting of the transmission shift lever 102 to corresponding gear pre-selection position.

Figure 19:
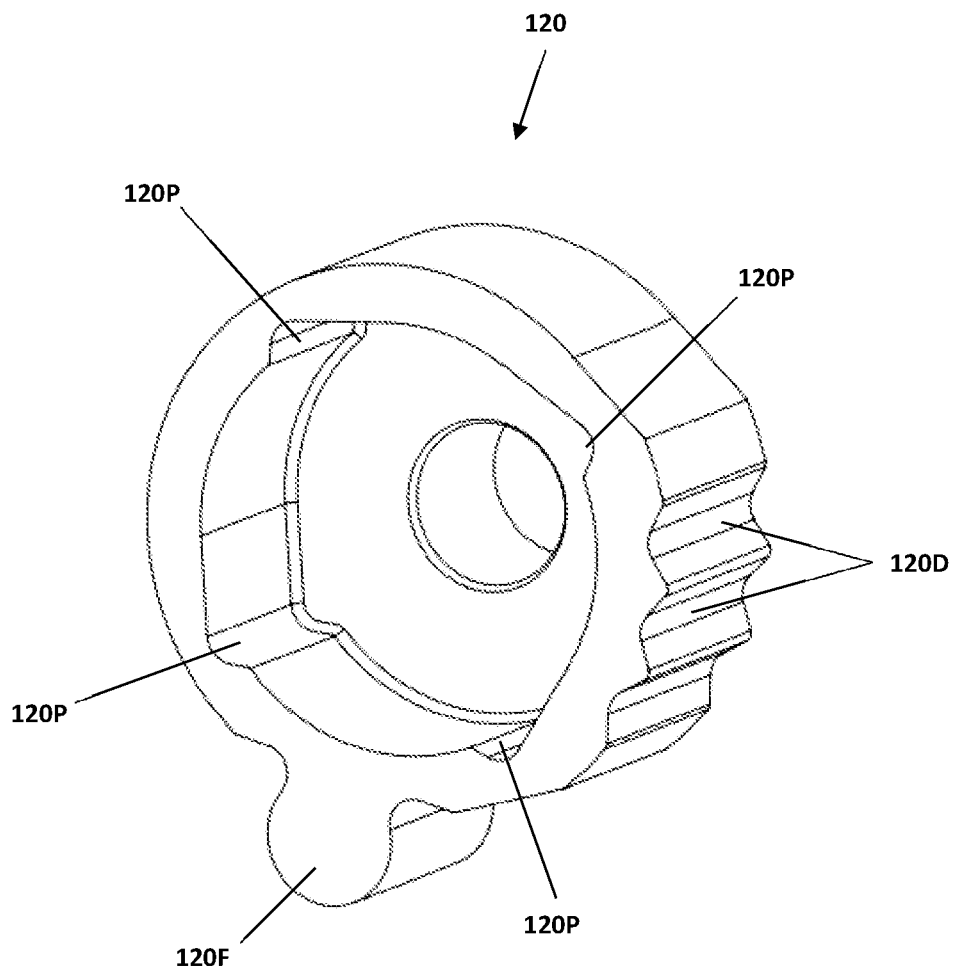
FIG. 19 depicts a perspective view of a rail shifting means, according to an embodiment of the invention as disclosed herein.
Figure 20:
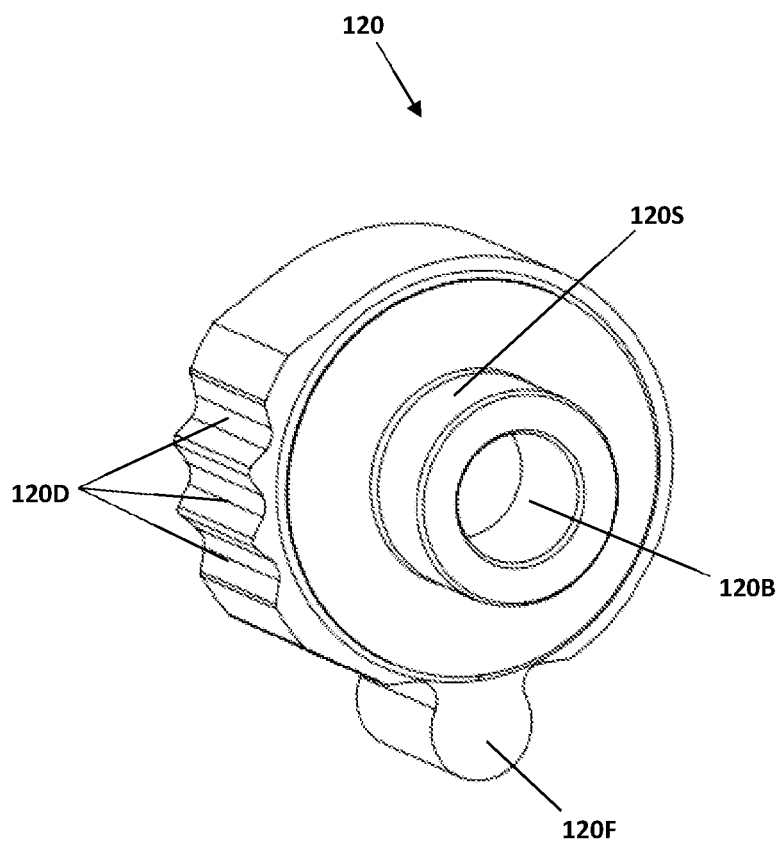
FIG. 20 depicts another perspective view of the rail shifting means, according to an embodiment of the invention as disclosed herein.
Figure 28:
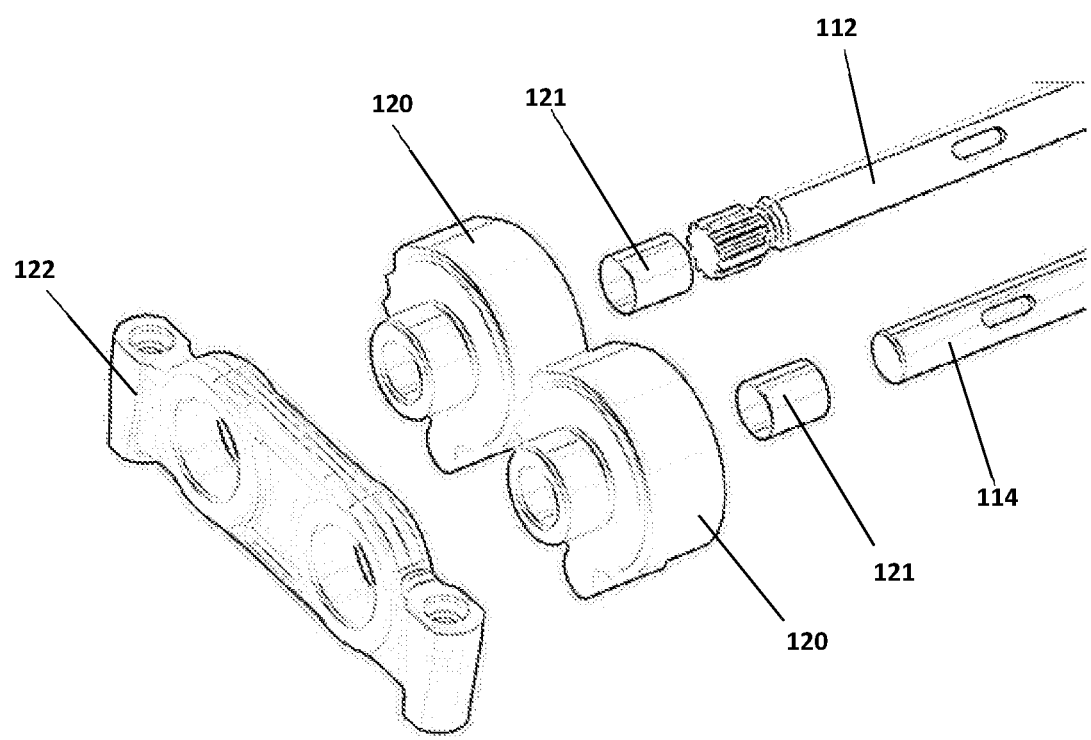
FIG. 28 depicts an exploded view showing rail shifting means, bushes, rail shifter support members, the drive shaft and the driven shaft, according to an embodiment of the invention as disclosed herein.

FIG. 19 depicts a perspective view of a rail shifting means, according to an embodiment of the invention as disclosed herein. FIG. 20 depicts another perspective view of the rail shifting means, according to an embodiment of the invention as disclosed herein. FIG. 28 depicts an exploded view showing rail shifting means, bushes, rail shifter support members, the drive shaft and the driven shaft, according to an embodiment of the invention as disclosed herein. The plurality of rail shifting means 120 is mounted to corresponding drive shaft 112 and driven shaft 114 through corresponding bush 121. Each rail shifting means 120 is freely rotating on corresponding drive shaft 112 and driven shaft 114. In an embodiment, each rail shifting means 120 is shifted (moved) by corresponding pawl assembly 124 therein to enable corresponding rail shifting means 120 to shift (move) corresponding shift rail 130 to in a predefined direction to enable movement of corresponding shift fork 132 and corresponding synchronizer unit 134 to corresponding gear position in a direction towards corresponding gear thereby facilitating preselection of corresponding gear on movement of the shifter arm 106 in a predefined direction and at a predefined angle during upshifting of the transmission shift lever 102 to corresponding gear pre-selection position. In an embodiment, each rail shifting means 120 defines a plurality of pawl locking portions 120P, a shift finger 120F, a plurality of detents 120D and a supporting portion 120S. The plurality of pawl locking portions 120P of each rail shifting means 120 are provided to an inner portion of the rail shifting means 120 at corresponding predetermined positions. In an embodiment, the plurality of pawl locking portions 120P of the rail shifting means 120 can be considered to be a plurality of internal teeth. The supporting portion 120S of each rail shifting means 120 defines a bush receiving portion 120B adapted to receive corresponding bush 121 therein to mount corresponding rail shifting means 120 to corresponding drive shaft 112 and driven shaft 114. The shift finger 120F of each rail shifting means 120 is adapted to shift (move) corresponding shift rail 128 in a predefined direction therein to move corresponding shift fork 134 and the synchronizer sleeve of corresponding synchronizer unit 132 in a direction from a neutral position to corresponding gear position in a direction towards corresponding gear thereby enabling engagement of corresponding synchronizer unit with corresponding gear to facilitate actuation of corresponding gear. Each detent 120D of each rail shifting means 120 is adapted to be selectively engaged by corresponding detent engaging element (detent ball or detent pin) therein to restrict the movement of corresponding rail shifting means 120 when corresponding gear is in engaged position (actuated position). In an embodiment, the plurality of rail shifting means 120 include a first gear position rail shifting means 120a, a second gear position rail shifting means 120b, a third gear position rail shifting means 120c, a fourth gear position rail shifting means 120d, a fifth gear position rail shifting means 120e, a sixth gear position rail shifting means 120f, a seventh gear position rail shifting means 120g and an eighth gear position rail shifting means 120h.

Figure 21:
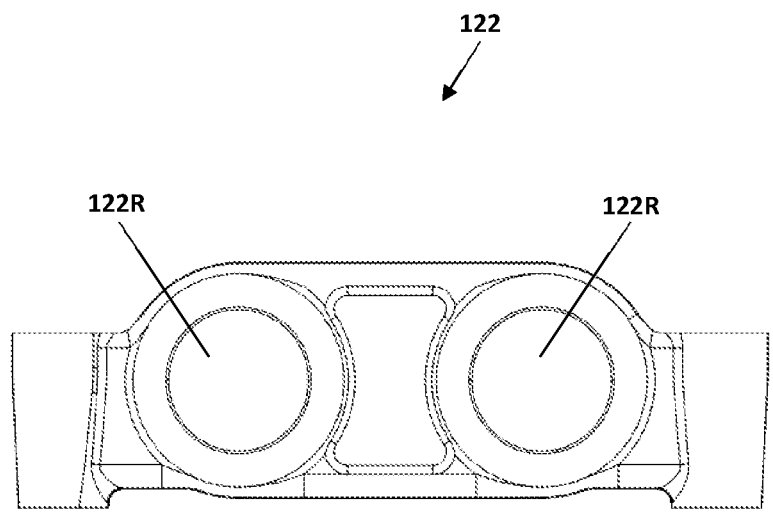
FIG. 21 depicts a front view of a rail shifter support member, according to an embodiment of the invention as disclosed herein.

FIG. 21 depicts a front view of a rail shifter support member, according to an embodiment of the invention as disclosed herein. Each rail shifter support member 122 is adapted to support corresponding rail shifting means 120. Each rail shifter support members 122 defines a plurality of rail shifter support receiving portions 122R adapted to receive the support portion 120S of corresponding rail shifting means 120d. Each rail shifter support members 122 is removably connected to a transmission shift cover or a transmission housing. The plurality of rail shifter support members 122 includes a first rail shifter support member 122A, a second rail shifter support member 122B, a third rail shifter support member 122C and a fourth rail shifter support member 122D.

Figure 22:
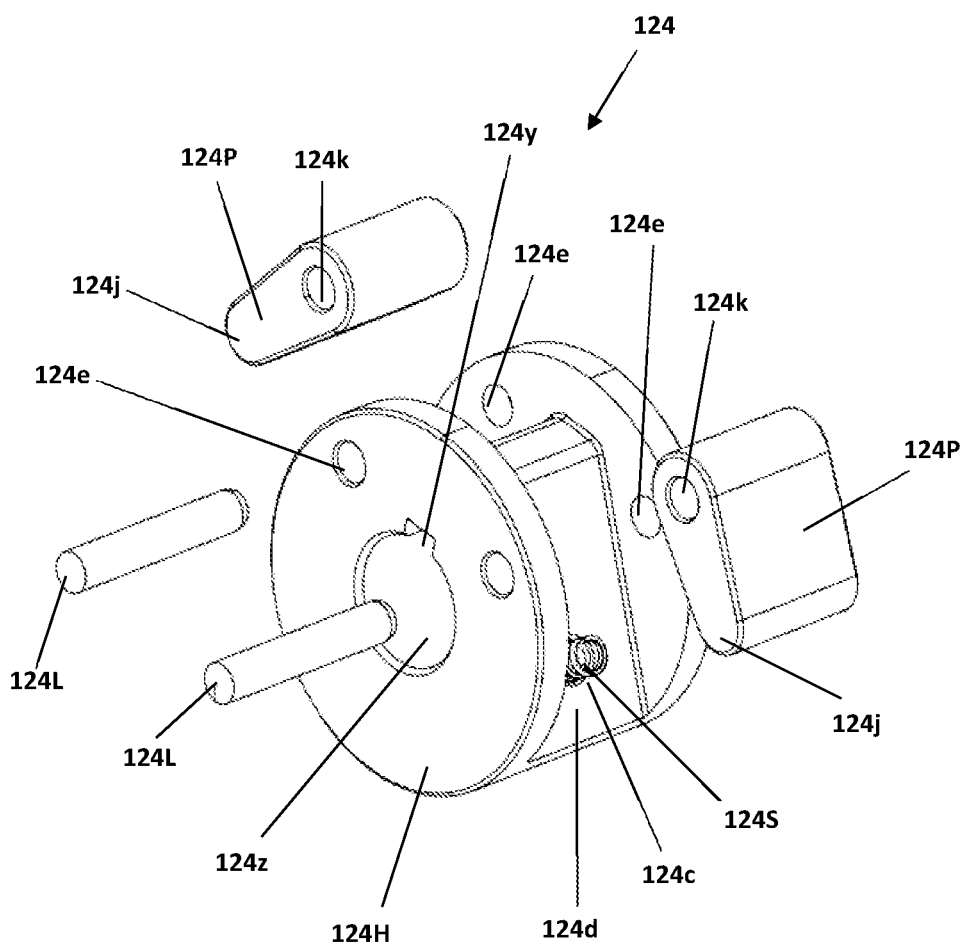
FIG. 22 depicts an exploded view of a pawl assembly, according to an embodiment of the invention as disclosed herein.
Figure 25:
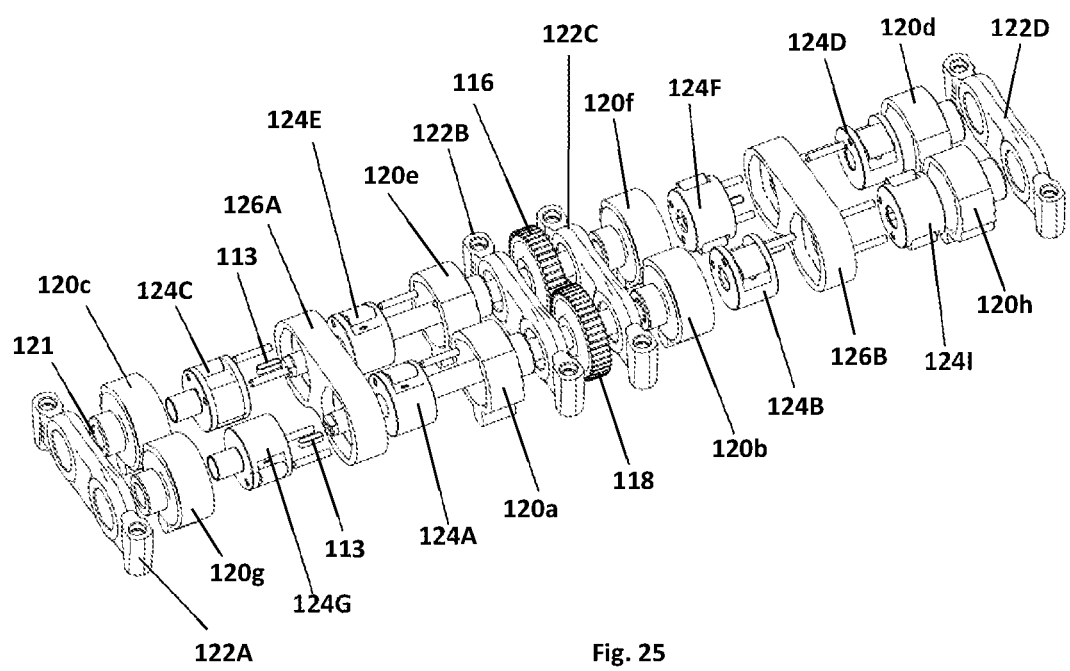
FIG. 25 depicts an exploded view of a plurality of rail shifting means, a plurality of rail shifter support members, a plurality of pawl assemblies and a plurality of pawl kicker means, according to an embodiment of the invention as disclosed herein.

FIG. 22 depicts an exploded view of a pawl assembly, according to an embodiment of the invention as disclosed herein. FIG. 25 depicts an exploded view of a plurality of rail shifting means, a plurality of rail shifter support members, a plurality of pawl assemblies and a plurality of pawl kicker means, according to an embodiment of the invention as disclosed herein. Each pawl assembly 124 includes a pawl housing 124H, a plurality of pawls 124P, a plurality of resilient means 124S and a plurality of pawl locking elements 124L. In an embodiment, the pawl housing 124H of each pawl assembly 124 defines a plurality of resilient member receiving portions 124c, a plurality of pawl receiving portions 124d, a plurality of pawl locking member receiving portions 124e and a shaft receiving portion 124z. Each resilient member receiving portion 124c of the pawl housing 124H of each pawl assembly 124 is adapted to receive a portion of corresponding resilient means 124S. Each resilient member receiving portion 124c of the pawl housing 124H of each pawl assembly 124 can be considered to be a cavity. Each pawl receiving portions 124d of the pawl housing 124H of each pawl assembly 124 is adapted to receive corresponding pawl 124P. Each pawl locking member receiving portion 124e of the pawl housing 124H of each pawl assembly 124 is adapted to receive corresponding pawl locking element 124L therein to engage corresponding pawl 124P with pawl housing 124H of corresponding pawl assembly 124 at a predetermined position. Each pawl locking member receiving portion 124e of the pawl housing 124H of each pawl assembly 124 can be considered to be a hole (opening). The shaft receiving portion 124z of the pawl housing 124H of the plurality of pawl assemblies 124 is adapted to receive corresponding portion of corresponding drive shaft 112 and the driven shaft 114. The shaft receiving portion 124z of the pawl housing 124H of the plurality of pawl assemblies 124 defines a keyway 124y adapted to receive corresponding keys 113 thereby rotatably mounting the plurality of pawl assemblies 124 to corresponding drive shaft 112 and driven shaft 114 at corresponding predetermined position. Each pawl 124P of each pawl assembly 124 is received by corresponding pawl receiving portion 124d of the pawl housing 124H of corresponding pawl assembly 124. Each pawl 124P of each pawl assembly 124 is loaded (spring loaded) to the pawl housing 124H of corresponding pawl assembly 124. Each pawl 124P of each pawl assembly 124 defines a locking portion 124j and a locking member receiving portion 124k. The locking member receiving portion 124k of each pawl 124P is adapted to receive corresponding pawl locking element 124L therein to connect each pawl 124P to the pawl housing 124H. The locking member receiving portion 124k of each pawl 124P can be considered to be a hole (opening). At least a portion of each resilient means 124S of each pawl assembly 124 is received by corresponding resilient member receiving portions 124c of the pawl housing 124H. Each pawl locking elements 124L of each pawl assembly 124 is adapted to be received by corresponding pawl locking member receiving portion 124e the pawl housing 124H there through to enable each pawl locking element 124L to be received by corresponding locking member receiving portion 124k of corresponding pawl 124P thereby facilitating engagement of corresponding pawl 124P with the pawl housing 124H of corresponding pawl assembly 124. Each pawl locking elements 124L of pawl assembly 124 can be considered to be a locking pin. It is also within the scope of the invention to provide each pawl assembly 124 with any other type of locking means to enable engagement of each pawl 124P with the pawl housing 124H of corresponding pawl assembly 124. The plurality of pawl assembly 124 includes a first gear position pawl assembly 124A, a second gear position pawl assembly 124B, a third gear position pawl assembly 124C, a fourth gear position pawl assembly 124D, a fifth gear position pawl assembly 124E, a sixth gear position pawl assembly 124F, a seventh gear position pawl assembly 124G and an eighth gear position pawl assembly 124I.

Figure 23:
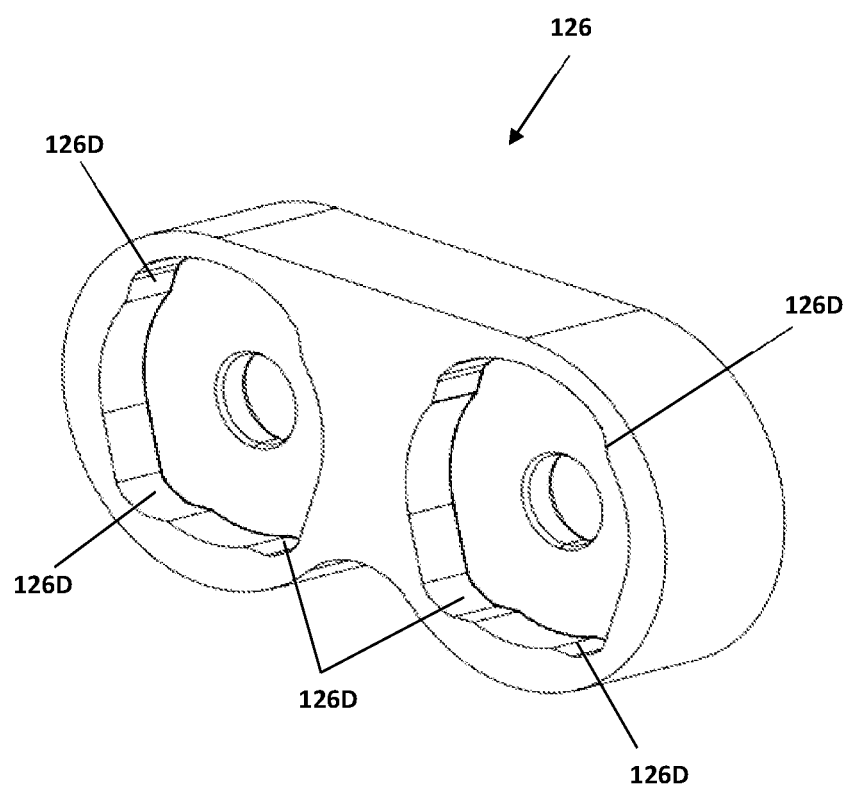
FIG. 23 depicts a perspective view of a pawl kicker means, according to an embodiment of the invention as disclosed herein.

FIG. 23 depicts a perspective view of a pawl kicker means, according to an embodiment of the invention as disclosed herein. Each pawl kicker means 126 includes a plurality of pawl dis-engaging portions 126D (timed pawl dis-engaging teeth). The plurality of pawl kicker means 126 includes a first pawl kicker means 126A and a second pawl kicker means 126B.

The plurality of shift rails 128 include a first and fifth gear position shift rail 128A, a second and sixth gear position shift rail 128B, a third and seventh gear position shift rail 128C and a fourth and eighth gear position shift rail 128D.

Figure 24:
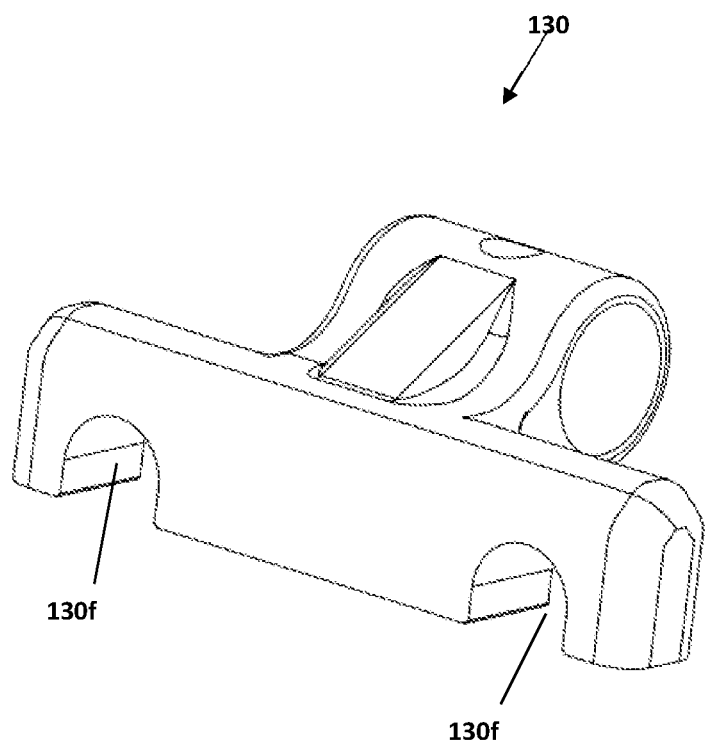
FIG. 24 depicts a perspective view of a shift rail-end, according to an embodiment of the invention as disclosed herein.
Figure 26:
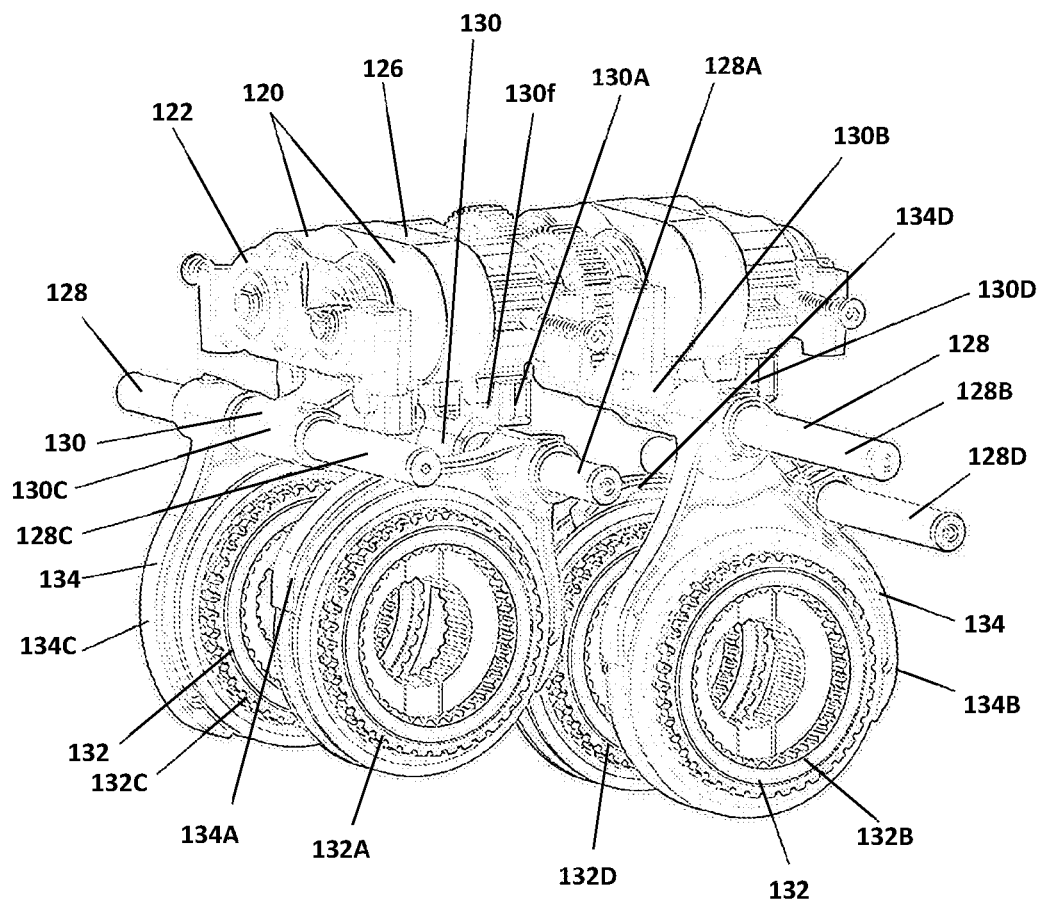
FIG. 26 depicts the shift rails, shift rail-ends and synchronizer units, according to an embodiment of the invention as disclosed herein.

FIG. 24 depicts a perspective view of a shift rail-end, according to an embodiment of the invention as disclosed herein. FIG. 26 depicts the shift rails, shift rail-ends and synchronizer units, according to an embodiment of the invention as disclosed herein. Each shift rail-end 130 defines a plurality of rail shifter means shift finger receiving portions 130f, where each means shift finger receiving portions 130f of each shift rail-end 130 is adapted to receive the shift finger 120F of corresponding rail shifting means 120 thereby connecting corresponding rail shifting means 120 to corresponding shift rail-end 130. The plurality of shift rail-ends 130 include a first and fifth gear position shift rail-end 130A, a second and sixth gear position shift rail-end 130B, a third and seventh gear position shift rail-end 130C and a fourth and eighth gear position shift rail-end 130D. The first and fifth gear position shift rail-end 130A is removably connected to the first and fifth gear position shift rail 128A at a predetermined position. The second and sixth gear position shift rail-end 130B is removably connected to the second and sixth gear position shift rail 128B at a predetermined position. The third and seventh gear position shift rail-end 130C is removably connected to the third and seventh gear position shift rail 128C at a predetermined position. The fourth and eighth gear position shift rail-end 130D is removably connected to the fourth and eighth gear position shift rail 128D at a predetermined position.

The plurality of synchronizers units 132 includes first and fifth gear position synchronizers unit 132A, second and sixth gear position synchronizers unit 132B, third and seventh gear position synchronizers unit 132C, and a fourth and eighth gear position 132D.

Each shift fork 134 includes a plurality of lugs adapted to be connected to the synchronizer sleeve of corresponding synchronizer unit 132. The plurality of shift fork 134 include a first and fifth gear position shift fork 134A, a second and sixth gear position shift fork 134B, a third and seventh gear position shift fork 134C and a fourth and eighth gear position shift fork 134D. The first and fifth gear position shift rail fork 134A is removably connected to the first and fifth gear position shift rail 128A at a predetermined position, and engaged with the synchronizer sleeve of the first and fifth gear position synchronizers unit 132A. The second and sixth gear position shift fork 134B is removably connected to the second and sixth gear position shift rail 128B at a predetermined position, and engaged with the synchronizer sleeve of the second and sixth gear position synchronizers unit 132B. The third and seventh gear position shift fork 134C is removably connected to the third and seventh gear position shift rail 128C at a predetermined position, and engaged with the synchronizer sleeve of the third and seventh gear position synchronizers unit 132C. The fourth and eighth gear position shift rail fork 134D is removably connected to the fourth and eighth gear position shift rail 128D at a predetermined position, and engaged with the synchronizer sleeve of the fourth and eighth gear position 132D.

The lever position control valve assembly 136 is provided in fluid communication with the master clutch control valve assembly 100M and the active detent control valve assembly 138.

Figure 27:
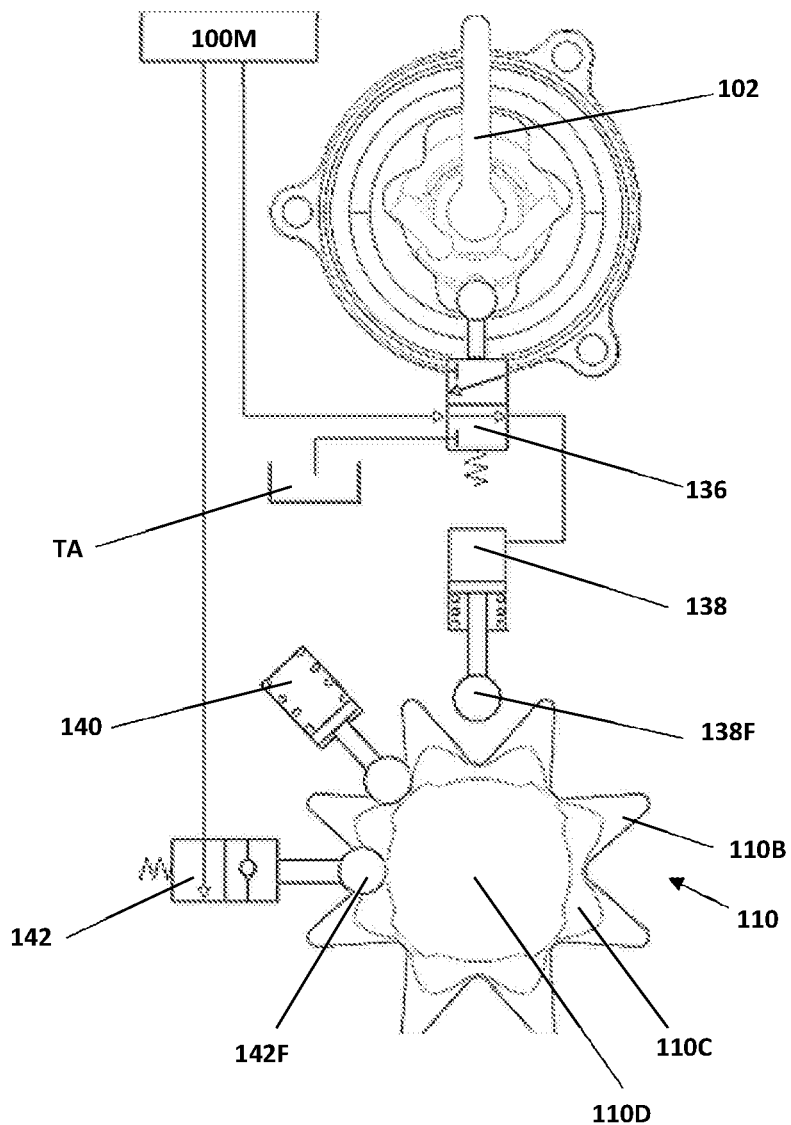
FIG. 27 depicts an active detent control valve assembly in fluid communication with a master clutch control valve assembly and a tank through a lever position control valve assembly, according to an embodiment of the invention as disclosed herein.

FIG. 27 depicts an active detent control valve assembly in fluid communication with a master clutch control valve assembly and a tank through a lever position control valve assembly, according to an embodiment of the invention as disclosed herein. The active detent control valve assembly 138 is provided in fluid communication with the master clutch control valve assembly 100M and the tank (not shown, the tank is used to store hydraulic fluid) through the lever position control valve assembly 136.

The clutch selection control valve assembly 142 is provided in fluid communication with at least one of the master clutch control valve assembly 100M.

The master clutch control valve assembly 100M is provided in fluid communication with the active detent control valve assembly 138 through the lever position control valve assembly 136. The master clutch control valve assembly 100M is provided in fluid communication with the clutch selection control valve assembly 142.

The working of the transmission control mechanism 100 during upshifting to second gear is follows. The shift finger 120F of said second rail shifting means 120 is moved to a predefined angle therein to move the second and sixth shift rail 128B in a predefined direction to enable movement of the second and sixth gear position shift fork 134B and the synchronizer sleeve of the second and sixth synchronizer unit 132B to move from neutral position to second gear position in a direction towards the second drive gear therein to enable engagement of synchronizer sleeve with second drive gear synchronizer ring of second and sixth synchronizer unit 132B thereby facilitating engagement (pre-selection) of second drive gear when the shifter arm 106 is moved at a predefined angle (0 to 13.5 degree), and the pawl disengaging portions (internal teeth) of said pawl kicker plate is adapted to move the locking portion 124*j* of at least one of said pawl 124P of said second gear position rail shifting means 120*b* away from corresponding pawl locking portion 120P (internal teeth) of said second rail shifting means 120 when the shifter arm is moved to a predefined angle (13.5 to 17.5 degree), and the cam follower of the cam selection valve assembly 142 engages the second gear position portion of the clutch selection cam 110D which in turn allows the master clutch control valve assembly 110M to actuate even clutch unit E when the shifter arm 106 is moved to a predefined angle (20 to 25 degree) on engagement of the transmission shift lever 102 (gear shift lever) adapted to be upshifted to a second gear preselect position. said position lever control valve assembly 136 provides pressurized hydraulic fluid from the master clutch control valve assembly 100M to said active detent control valve assembly 138 thereby moving the cam follower 138F of said an active detent control valve assembly 138 in direction towards said active detent cam 110B of said input shift ratchet and cam assembly 110 thereby moving said fifth pawl assembly 124 at a predefined angle when said shifter arm 106 is at a predefined angle (27.5 to 41 degree) therein to enable the locking portion 124*j* of at least one of said pawl 124P of said fifth gear position rail shifting means 120*e* to engage with corresponding pawl locking portion 120P (internal teeth) of said fifth rail shifting means 120 to move the shift finger 120F at a predefined angle which in turn moves first and fifth gear position shift rail 128 in a predefined direction therein to enable movement of said first and fifth gear position shift fork 134A and the synchronizer sleeve of first and fifth synchronizer unit from first gear position to neutral position in a direction away from the first drive gear therein to dis-engage the synchronizer sleeve from the synchronizer ring of first and fifth synchronizer unit thereby facilitating dis-engagement of first drive gear when the shift ratchet 108A is at a predefined angle (27.5 to 41 degree) therein to enable actuation of second drive gear, and the pawl disengaging portions (internal teeth) of said pawl kicker plate is adapted to move the locking portion 124*j* of at least one of said pawl 124P of said fifth gear position rail shifting means 120*e* away from corresponding pawl locking portion 120P (internal teeth) of said fifth rail shifting means 120 when the shift ratchet is moved to a predefined angle (41 to 45 degree).

Figure 29:
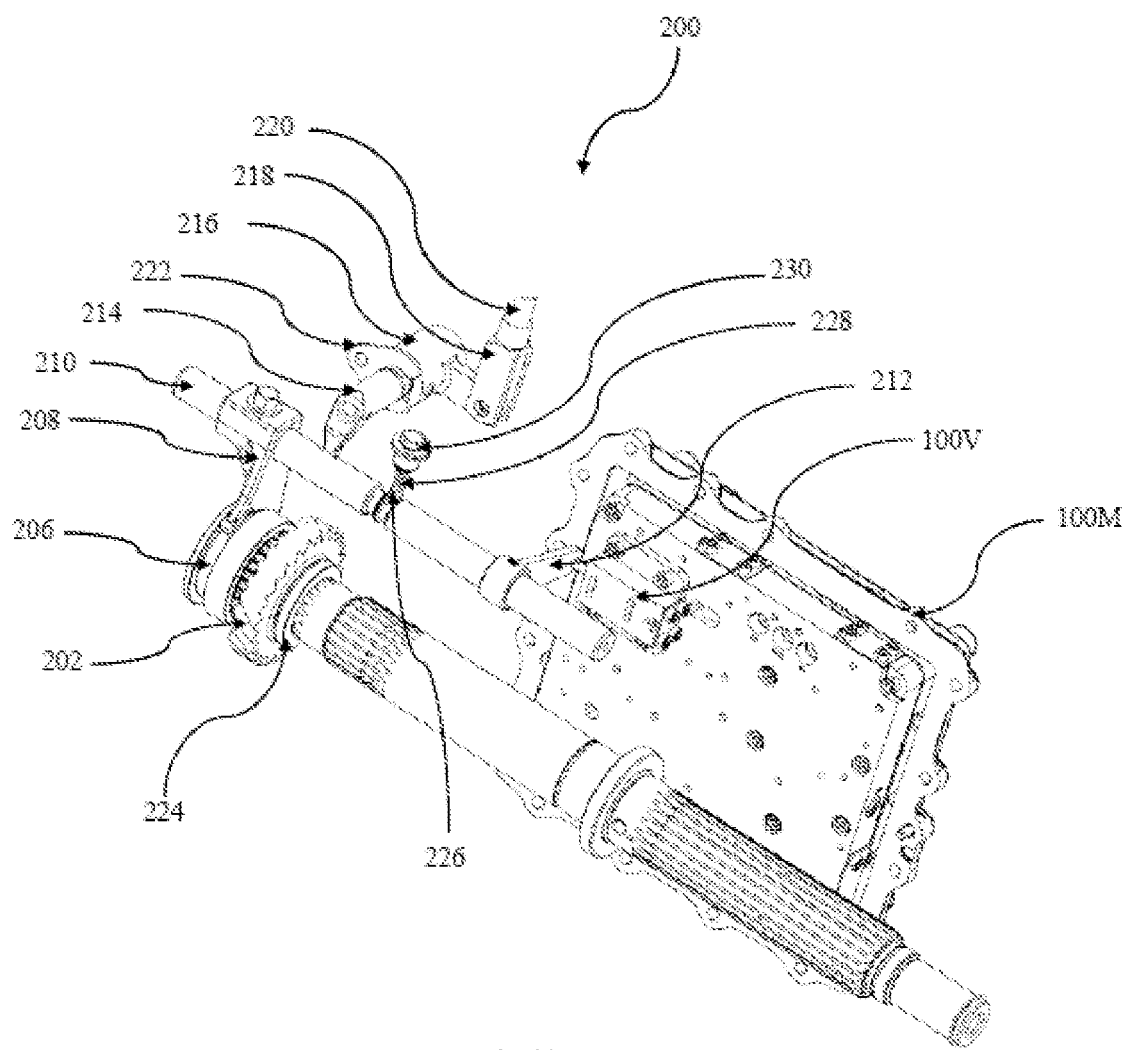
FIG. 29 depicts a perspective view of an auxiliary transmission actuation mechanism in the manual dual clutch power transmission unit of a vehicle, according to an embodiment of the invention as disclosed herein.

FIG. 29 depicts a perspective view of an auxiliary transmission actuation mechanism in the manual dual clutch power transmission unit of a vehicle, according to an embodiment of the invention as disclosed herein. In an embodiment, the auxiliary transmission actuation mechanism 200 (tow start mechanism/transmission starting mechanism) includes a transmission actuating gear 202, a gear driven bush 204, a gear actuating means 206, a shift fork 208, a shift rail 210 (also called as shifter rod), a clutch control valve actuating arm 212, a rail shifting means 214, a rail shifter turn link 216, a coupler 218, an auxiliary transmission actuating shift lever 220, a rail shifter locking means 222, a spacer 224, a detent engaging element 226, a spring 228, a spring retainer 230 and a circlip (not shown).

The transmission actuating gear 202 (as shown in FIG.) is mounted onto at least one of the even shaft and the odd shaft of the multi-speed transmission unit through the transmission actuating gear driven bush 204 at a predetermined position and rotatably connected to a forward drive gear of the synchro-shuttle transmission unit, where the forward drive gear of the synchro shuttle transmission unit is mounted onto the clutch shaft of the power transmission unit at a predetermined position. The transmission actuating gear 202 is provided at a predetermined distance from at least one of the even shaft and the odd shaft of the multi-speed transmission unit in the power transmission unit. In an embodiment, the transmission actuating gear 202 can be considered as tow start gear (transmission starting gear), which is used to actuate the power transmission unit therein to transmit the power from the engine (not shown) to an output shaft of the multi-speed transmission unit in the power transmission unit thereby propelling the vehicle when at least one of the dual clutch unit and the hydraulic system (not shown) of the vehicle is not functioning or working i.e., the transmission actuating gear 202 (tow start gear/transmission starting gear) drives at least one of the even shaft and the odd shaft of the multi-speed transmission unit on engagement of the gear actuating means 206 with the transmission actuating gear 202 thereby facilitating transfer of power from the main drive shaft (main drive shaft receives power from engine) to at least one of the even shaft and odd when at least one of the forward drive gear and reverse drive gear is in actuated position/engaged position (engagement of forward and reverse synchronizer unit with at least one of the forward drive gear and reverse drive gear of the synchro-shuttle transmission unit), and at least one of the even shaft and odd shaft which in turn drives at least one of an even drive gear and an odd drive gear respectively which in turn drives the output shaft through an odd and even driven gear on engagement of corresponding synchronizer unit with the at least one of even drive gear and odd drive gear respectively to transmit the power to the output shaft thereby facilitating propulsion of the vehicle when at least one of the dual clutch unit and the hydraulic system of the vehicle is not functioning/working. In an embodiment, the transmission actuating gear 202 defines a plurality of external teeth 202E, a plurality of locking elements 202L, a side portion 202S, another side portion 202P and a bush receiving portion 202B. The plurality of external teeth 202E (can be considered as external splines) of the transmission actuating gear 202 are provided in engagement (constant mesh) with corresponding plurality of external teeth (external splines) of the forward drive gear of the synchro-shuttle transmission unit. In an embodiment, the plurality of locking elements 202L of the transmission actuating gear 202 (tow start gear/transmission starting gear) is adapted to be engaged by the gear actuating means 206 on movement of the gear actuating means 206 from a neutral position (N) to an auxiliary transmission actuation gear position (T, can be considered as tow start gear position/transmission starting gear position) in a direction towards the transmission actuating gear 202 thereby facilitating actuation (engagement) of the transmission actuating gear 202 therein to enable the transmission actuating gear 202 to drive the even shaft through the gear actuating means 206 thereby transmitting the power from the main drive shaft 10M (main drive shaft receives power from engine) to the even shaft of the multi-speed transmission unit when forward drive gear of the synchro-shuttle power transmission unit 10S in in actuated position/engaged position (engagement of forward and reverse synchronizer unit with the forward drive gear of the synchro-shuttle transmission unit), and the even shaft drives the second drive gear which in turn drives the output shaft through the first and second driven gear (first and second speed driven gear) on engagement of corresponding synchronizer unit with the second drive gear (second speed drive gear) to transmit the power to the output shaft thereby propelling the vehicle when at least one of the dual clutch unit and the hydraulic system of the vehicle is not functioning/working. The plurality of locking elements 202L of the transmission actuating gear 202 is adapted to extend from the side portion 202S of the transmission actuating gear 202. In an embodiment, plurality of locking elements 202L of the transmission actuating gear 202 can be considered to be a plurality of external teeth (external splines). The bush receiving portion 202B of the transmission actuating gear 202 is adapted to receive the transmission actuating gear driven bush 204 thereby facilitating mounting of the transmission actuating gear 202 onto the even shaft through the transmission actuating gear driven bush 204 at a predetermined position. The bush receiving portion 202B of the transmission actuating gear 202 can be considered as a bore/opening. In an embodiment, the transmission actuating gear 202 is a helix gear. It is also within the scope of the invention to provide the auxiliary transmission actuation mechanism 200 with any other type of gears to act (serve) as transmission actuating gear 202.

In another embodiment, the transmission actuating gear 202 (as shown in FIGS. 12 and 13) is movably (slidably) connected to the even shaft of the multi-speed transmission unit. The transmission actuating gear 202 is selectively engaged with the forward drive gear of the synchro-shuttle transmission unit. In another embodiment, the transmission actuating gear 202 (as shown in FIGS. 12 and 13) can be considered as tow start gear (transmission starting gear), which is used to actuate the power transmission unit therein to transmit the power from the engine (not shown) to the output shaft of the multi-speed transmission unit in the power transmission unit 10 thereby propelling the vehicle when at least one of the dual clutch unit and the hydraulic system (not shown) of the vehicle is not functioning or working i.e., the transmission actuating gear 202 (as shown in FIG. 12, tow start gear/transmission starting gear) drives the even shaft of the multi-speed transmission unit on engagement of the transmission actuating gear 202 with the forward drive gear of the synchro-shuttle transmission unit which occurs on movement of the transmission actuating gear 202 from the neutral position (N) to the auxiliary transmission actuation gear position (T) therein to enable engagement of the transmission actuating gear 202 with the forward drive gear thereby facilitating actuation of the transmission actuating gear 202 to transfer the power from the main drive shaft 10M to the even shaft when the forward drive gear is in actuated position/engaged position (engagement of forward and reverse synchronizer unit with the forward drive gear of the synchro-shuttle transmission unit), and the even shaft drives the second drive gear (second speed drive gear) which in turn drives the output shaft through the first and second driven gear (first and second speed driven gear) on engagement of corresponding synchronizer unit with the second drive gear to transmit the power to the output shaft thereby propelling the vehicle when at least one of the dual clutch unit and the hydraulic system of the vehicle is not functioning/working. In another embodiment, the transmission actuating gear 202 (as shown in FIG.) defines a plurality of external teeth 202E, a plurality of internal teeth 202I, an outer portion 202u, an inner portion 202v, a side portion 202x, another side portion 202y and a first portion 202F. The plurality of external teeth 202E (external splines) of the transmission actuating gear 202 are provided to an outer portion 202u (outer diameter) of the transmission actuating gear 202 along the circumference of the outer portion 202*u* (outer diameter) of the transmission actuating gear 202, and extends between the side portion 202*x* and another side portion 202*y* of the transmission actuating gear 202. The plurality of external teeth 202E (external splines) of the transmission actuating gear 202 are adapted to engage corresponding plurality of external teeth of the forward drive gear on movement of the transmission actuating gear 202 (as shown in FIG.) from the neutral position (N) to the auxiliary transmission actuation gear position (T, can be considered as tow start gear position) thereby facilitating actuation (engagement) of the transmission actuating gear 202 therein to enable the transmission actuating gear 202 to drive the even shaft to transmit the power from the main drive shaft 10M (main drive shaft receives power from engine) to the even shaft of the multi-speed transmission unit when forward drive gear of the synchro-shuttle power transmission unit 10S in in actuated position/engaged position (engagement of forward and reverse synchronizer unit with the forward drive gear of the synchro-shuttle transmission unit), and the even shaft drives the second drive gear (second speed drive gear) which in turn drives the output shaft through the first and second driven gear (first and second speed driven gear) on engagement of corresponding synchronizer unit with the second drive gear (second speed drive gear) to transmit the power to the output shaft thereby propelling the vehicle when at least one of the dual clutch unit and the hydraulic system of the vehicle is not functioning/working. The plurality of internal teeth 2021 of the transmission actuating gear 202 are provided to the inner portion 10*v* (inner diameter) of the transmission actuating gear 202 along the circumference of the inner portion 202*v* (inner diameter) of the transmission actuating gear 202, and extends between the side portion 202*x* and another side portion 202*y* of the transmission actuating gear 202. The plurality of internal teeth 2021 of the transmission actuating gear 202 is adapted to movably engaged (movably connected) to corresponding plurality of external teeth of the even shaft. The plurality of internal teeth 2021 of the transmission actuating gear 202 is adapted to facilitate movement of the transmission actuating gear 202 on the even shaft from the neutral position (N) to the auxiliary transmission actuation gear position (T) which occurs due to the movement of the shift fork 208 from the neutral position (N) to the auxiliary transmission actuation gear position (T). The first portion 202F of the transmission actuating gear 202 is adapted to extends from corresponding another side portion 202*x* of the transmission actuating gear 202. The first portion 202F of the transmission actuating gear 202 defines a portion 202P and a shift fork lug receiving portion 202L. The portion 202P of the first portion 202F is radially extending along the circumference of the first portion 202F, where the portion 202P is at least a locking collar (stopper) adapted to restrict the releasing of the shift fork 208 from the transmission actuating gear 202. The shift fork lug receiving portion 202L of the first portion 202F is between corresponding side portion 10*x* of the transmission actuating gear 202 and the portion 202P of the first portion 202F of the transmission actuating gear 202, where the shift fork lug receiving portion 202L is adapted to receive a plurality of lugs 208L (as shown in FIG.) of the shift fork 208 therein to facilitate engagement of the plurality of lugs 202L of the shift fork 208 with corresponding side portion 10*x* of the transmission actuating gear 202 and the portion 202P of the first portion 202F of the transmission actuating gear 202. The shift fork lug receiving portion 202L of the first portion 202F of the transmission actuating gear 202 can be considered to be a groove (circumferential groove) provided on the first portion 202F between the side portion 10*x* of transmission actuating gear 202 and the portion 202P of the first portion 202F of transmission actuating gear 202. In another embodiment, the transmission actuating gear 202 (as shown in FIG.) is a spur gear. It is also within the scope of the invention to provide the auxiliary transmission actuation mechanism 200 with any other type of gears to act (serve) as transmission actuating gear 202. The aforementioned transmission actuating gear 202 (as shown in FIG.) eliminates the usage of the gear driven bush 204, the gear actuating means 206, the spacer 224 and circlip (not shown).

The transmission actuating gear driven bush 204 is used to mount the transmission actuating gear 202 (as shown in FIG.) onto the even shaft at a predetermined position therein to restrict the transfer of power from the forward drive gear of the synchro-shuttle transmission unit to the even shaft of the multi-speed transmission unit through the transmission actuating gear 202 when the transmission actuating gear 202 is in de-actuated position (non-engaged position), and at least one of the gear actuating means 206 and the auxiliary transmission actuating shift lever 220 is not in the auxiliary transmission actuation gear position (T). The transmission actuating gear driven bush 204 includes a body 204B and a portion 204P. The body 204B of the transmission actuating gear driven bush 204 is adapted to facilitate mounting of the transmission actuating gear 202 thereby mounting the transmission actuating gear 202 to the even shaft of the multi-speed transmission unit at a predetermined position. The body 204B of the transmission actuating gear driven bush 204 defines a plurality of internal splines 2041 corresponding to the plurality of external splines of the even shaft. The plurality of internal splines 2041 of the body 204B of the transmission actuating gear driven bush 204 are provided to an inner portion 204*v* (inner diameter) of the body 204B of the transmission actuating gear driven bush 204 along the circumference of the inner portion 204*v* (inner diameter) of body 204B of the transmission actuating gear driven bush 204 and extends between corresponding side portions of the transmission actuating gear driven bush 204. The body 204B of the transmission actuating gear driven bush 204 defines a plurality of lubrication passages 204H adapted to facilitate flow of the lubricant therethrough. The plurality of lubrication passages 204H of the body 204B of the transmission actuation gear driven bush 204 at corresponding predetermined positions, and extends from the outer portion 204*u* to the inner portion 204*v* of the body 204B of the transmission actuation gear driven bush 204. The plurality of lubrication passages 204H of the body 204B of the transmission actuation gear driven bush 204 can considered to be a hole/opening. The outer portion 204*u* (outer diameter) of the body 204B of the transmission actuating gear driven bush 204 is grinded, where the transmission actuating gear 202 is mounted onto the outer portion 204*u* (outer diameter) of the body 204B of the gear driven bush 204. The portion 204P of the transmission actuating gear driven bush 204 is radially extending along the circumference of corresponding end of the body 204B of the transmission actuating gear driven bush 204, where the portion 204P is at least a locking collar (stopper) adapted to restrict the linear movement of the transmission actuating gear 202 thereby restricting the releasing of the transmission actuating gear 202 from the transmission actuating gear driven bush 204.

The gear actuating means 206 can be considered to be a shifter sleeve. The gear actuating means 206 is used to facilitate actuation (engagement) of the transmission actuating gear 202 i.e., the gear actuating means 206 moves from the neutral position (N) to the auxiliary transmission actuation gear position (T) in a direction towards the transmission actuating gear 202 therein to enable engagement of the gear actuating means 206 with the transmission actuating gear 202 (as shown in FIG.) thereby facilitating actuation of the transmission actuating gear 202 in response to the movement of the shift fork 208 from the neutral position (N) to the auxiliary transmission actuation gear position (T). In an embodiment, the gear actuating means 206 defines a plurality of locking elements 206L corresponding to the plurality of locking elements 202L (as shown in FIG.) of the transmission actuating gear 202. The plurality of locking elements 206L of the gear actuating means 206 are adapted to engage corresponding plurality of locking elements 202L of the transmission actuating gear 202 therein to facilitate actuation of the transmission actuating gear 202 on movement of the gear actuating means 206 from the neutral position (N) to the auxiliary transmission actuation gear position (T) which occurs due to the movement of the shift fork from the neutral position (N) to the auxiliary transmission actuation gear position (T). The plurality of locking elements 206L of the gear actuating means 206 can be considered to be plurality of internal teeth (internal splines). The plurality of locking elements 206L (internal splines) of the gear actuating means 206 are provided to an inner portion 206v of the gear actuating means 206. The gear actuating means 206 defines a plurality of internal teeth 206I corresponding to the plurality of external teeth of the even shaft of the multi-speed transmission unit. The plurality of internal teeth 206I of the gear actuating means 206 is movably (slidably) connected to corresponding plurality of external teeth of the even shaft. The plurality of internal teeth 206I of the gear actuating means 206 is adapted to facilitate movement of the gear actuating means 206 on the even shaft from the neutral position (N) to the auxiliary transmission actuation gear position (T) which occurs due to the movement of the shift fork 208 from the neutral position (N) to the auxiliary transmission actuation gear position (T). The plurality of internal teeth 206I of the gear actuating means 206 is provided to another inner portion 206w (inner diameter) of the gear actuating means 206. The gear actuating means 206 defines a portion 206P which is provided to the gear actuating means 206 at a predetermined position (can be considered as corresponding end of the gear actuating means 206). The portion 206P of the gear actuating means 206 is radially extending along the circumference of corresponding end of the gear actuating means 206, where the portion 202P is at least a locking collar (stopper) adapted to restrict the releasing of the shift fork 208 from the gear actuating means 208. The gear actuating means 206 defines a shift fork lug receiving portion 206R provided to the gear actuating means 206 at a predetermined position. The shift fork lug receiving portion 206R of the gear actuating means 206 is used to receive a plurality of lugs 208L (as shown in FIG.) of the shift fork 208 therein to facilitate engagement of the plurality of lugs 202L of the shift fork 208 with the gear actuating means 208. The shift fork lug receiving portion 206R of the gear actuating means 206 can be considered to be a groove (circumferential groove).

The shift fork 208 is used to move the gear actuating means 206 (shifter sleeve) from the neutral position (N) to the auxiliary transmission actuation gear position (T) in a direction towards the transmission actuating gear 202 therein to facilitate engagement of the plurality of locking elements 206L (internal teeth/internal splines) of the gear actuating means 206 with corresponding plurality of locking elements 202L (external teeth/external splines) thereby actuating the transmission actuating gear 202 in response to the movement of the shift rail 210 along a predefined direction. The shift fork 208 is connected to the shifter rail 210 at a predetermined position. The shift fork 208 includes a plurality of lugs 208L, a shift rail receiving portion 208R and a fastener receiving portion 208F. The plurality of lugs 208L of the shift fork 208L is adapted to be received by the shift fork lug receiving portion 206R of the gear actuating means 206 thereby connecting the shift fork 208 to the gear actuating means 206 (shifter sleeve). The shift rail receiving portion 208R of the shift fork 208 is used to receive corresponding portion of the shift rail 210. The shift rail receiving portion 208R of the shift fork 208 can be considered to be a bore/opening. The fastener receiving portion 208F of the shift fork 208 is used to receive a fastener (not shown) therethrough therein to facilitate secure mounting of the shift fork 208 onto the shift rail 210. The fastener receiving portion 208F of the shift fork 208 can be considered to be a hole/an opening.

The shift rail 210 (shifter rod) is adapted to move along a predefined direction thereby moving the shift fork 208 and the gear actuating means 210 from the neutral position (N) to the auxiliary transmission actuation gear position (T) in response to the movement of the rail shifting means 214 in a predefined direction (anti-clockwise direction). The shift rail 210 includes a rail shifter receiving portion 210R, a first fastener receiving portion 210F, a second fastener receiving portion 210S and a plurality of detents 210D. The rail shifter receiving portion 210R of the shift rail 210 is provided to the shift rail 210 at a predetermined position, where the rail shifter receiving portion 210R is used to receive corresponding portion of the rail shifting means 214. The rail shifter receiving portion 210R of the shift rail 210 can be considered to be a groove/slot. The first fastener receiving portion 210F of the shift rail 210 is provide to the shift rail 210 at a predetermined position, where the first fastener receiving portion 210F is used to receive a fastener (not shown) therein to secure the shift fork 208 to the shift rail 210. The first fastener receiving portion 210F of the shift rail 210 can be considered to be a hole/opening. The second fastener receiving portion 210S of the shift rail 210 is provided to the shift rail 210 at a predetermined position, where the second fastener receiving portion 210S is used to receive a fastener (not shown) therein to secure the clutch control valve actuating arm 212 to the shift rail 210. The second fastener receiving portion 210S of the shift rail 210 can be considered to be a hole/opening. The plurality of detents 210D of the shift rail 210 includes a neutral position groove 210N and an engaged position groove 210E. The detent engaging element 226 engages the neutral position groove 210N when at least one of the auxiliary transmission actuating shift lever 220, the shift fork 208 and the gear actuating means 206 are in neutral position and also when the transmission actuating gear 202 is in de-actuated position/dis-engaged position.

The clutch control valve actuating arm 212 is adapted to engage and move a movable member (inching spool/plunger) of the clutch control valve assembly 100V of the master cutch valve assembly C thereby actuating the clutch control valve assembly 100V to de-actuate the dual clutch unit on movement of the shift rail 210 along the predefined direction (anti-clockwise direction). The clutch control valve actuating arm 212 defines a shift rail receiving portion 212R and a fastener receiving portion 212F. The shift rail receiving portion 212R of the clutch control valve actuating arm 212 is used to receive corresponding portion of the shift rail 210. The shift rail receiving portion 212R of the clutch control valve actuating arm 212 can be considered to be a bore/opening. The fastener receiving portion 212F of the clutch control valve actuating arm 212 is used to receive a fastener (not shown) therethrough therein to facilitate secure mounting of the clutch control valve actuating arm 212 onto the shift rail 210. The fastener receiving portion 212F of the clutch control valve actuating arm 212 is at least a bore/opening.

The rail shifting means 214 is connected to the shifter rail 210 at a predetermined position. The rail shifter means 214 is used to shift/move the shifter rail 210 in a predefined direction in response to the movement of the rail shifter turn link 216 along a predefined direction (anticlockwise direction). The rail shifting means 214 includes a first portion 214F and a second portion 214S. The first portion 214F of the rail shifting means 214 defines a roll pin receiving portion 214R, a locking member receiving portion 214L and an oil ring receiving portion 214U. The roll pin receiving portion 214R of the rail shifting means 214 is used to receive a roll pin therein to secure the rail shifter turn link 216 to the first portion 214F of the rail shifting means 214, where the roll pin receiving portion 214R can be considered to be hole/an opening. The locking member receiving portion 214L of the rail shifting means 214 is used to receive corresponding portion of the rail shifter locking means 216 therein to restrict the axial movement of the rail shifting means 214, where the locking member receiving portion 214L of the rail shifting means 214 can be considered to be a groove. The oil ring receiving portion 214U of the rail shifting means 214 is used to receive an oil ring (not shown), where the oil ring receiving portion 214U can be considered to be a groove. The second portion 214S of the rail shifting means 214 is provided to the rail shifter receiving portion 210R of the shifter rail 210 thereby connecting the rail shifting means 214 to the shifter rail 210.

The rail shifter turn link 216 is used to move the rail shifting means 214 along a predefined direction therein to shift/move the shift rail 210 in the predefined direction on movement of the auxiliary transmission actuating shift lever 220 from the neutral position (N) to the auxiliary transmission actuation gear position (T). The rail shifter turn link 216 includes a body 216B and an arm 216A. The body 216B of the rail shifter turn link 216 defines a rail shifter receiving portion 216S and a plurality of roll pin receiving portions 216R. The rail shifter receiving portion 216S of the body 216B of the rail shifter turn link 216 is used to receive the first portion 214F of the rail shifting means 214, and the plurality of roll pin receiving portions 216R are adapted to receive the roll pin there through to secure the rail shifter turn link 216 to the rail shifting means 214. The rail shifter receiving portion 216S of the body 216B of the rail shifter turn link 216 can be considered as bore/opening. The roll pin receiving portions 216R of the rail shifter turn link 216 can be considered to be a hole/opening. The arm 216A of the rail shifter turn link 216 is adapted to transversely extend from the body 216B of the rail shifter turn link 216. The arm 216A of the rail shifter turn link 216 defines a fastener receiving portion.

The working of the auxiliary transmission actuation mechanism 200 in the power transmission unit 10 is as follows. During breakdown condition of the vehicle which occurs due to malfunctioning of the dual clutch unit and/or the hydraulic system of the vehicle, the operator pulls the auxiliary transmission actuation shift lever 220 in an upward direction which causes the rail shifter turn link 216 to move in an anticlockwise direction therein to move the rail shifting means 214 in an anticlockwise direction which in turn moves the shifter rail 210 to move in a predefined direction thereby moving the shift fork 208 and the gear actuating means 206 from a neutral position (N) to the auxiliary transmission actuation gear position (T) in a direction towards the transmission actuating gear 202 therein to enable engagement of the plurality of locking elements 206L of the gear actuating means 206 with corresponding plurality of locking elements 202L of the transmission actuating gear 202 thereby facilitating actuation (engagement) of the transmission actuating gear 202 therein to enable the transmission actuating gear 202 to drive the even shaft through the gear actuating means 206, and the even shaft drives the output shaft through gears of the power transmission unit 10 thereby propelling the vehicle to the service station. Before the actuation of the transmission actuating gear 202, clutch control valve actuating arm 212 is adapted to engage the movable member of said clutch control valve assembly 100V therein to move the movable member of said clutch control valve assembly 100V to a predefined position thereby actuating said clutch control valve assembly 100V to restrict the hydraulic fluid to flow to said dual clutch unit by allowing the hydraulic fluid to flow to a tank of said hydraulic system thereby de-actuating said dual clutch unit on movement of said shift rail 210 along the predefined direction thereby assisting said transmission actuating gear 202 to drive said even shaft on actuation of said transmission actuating gear 202, and said even shaft drives said second drive gear therein to enable said second drive gear to drive said output shaft through said first and second driven gear on engagement of corresponding synchronizer unit with the second drive gear to transmit the power to said output shaft thereby propelling the vehicle when at least one of said dual clutch unit and the hydraulic system of the vehicle is not functioning.

Therefore, a manual dual clutch power transmission unit 10 with 24 forward speeds and 24 reverse speeds is provided for a vehicle.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

We claim:

1. A manual dual clutch power transmission unit (10) for a vehicle, said power transmission unit (10) comprising:
 a synchro-shuttle transmission unit (10S) comprising a forward drive gear (12) adapted to be mounted onto a wet clutch shaft (10W) at a predetermined position;
 a reverse drive gear (13) adapted to be mounted onto a main drive shaft (10M) through a reverse drive gear driven bush (13B) at a predetermined position and rotatably connected to said forward drive gear (12) through a cluster of reverse idler gears (14); and
 a forward and reverse synchronizer unit (11) adapted to be mounted onto said main drive shaft (10M) between said a reverse drive gear (13) and said forward drive gear (12);

a multi-speed transmission unit (10T) comprising an odd shaft (16); an even shaft (18); an output shaft (20);

a plurality of odd drive gears (16X) comprising a first drive gear (16A) adapted to be mounted onto said odd shaft (16) through a first drive gear driven bush (16Ab) at a predetermined position, a third drive gear (16B) adapted to be mounted onto said odd shaft (16) through a third drive gear driven bush (16Bb), a fifth drive gear (16C) adapted to be mounted onto said odd shaft (16) through a fifth drive gear driven bush (16Cb) at a predetermined position and a seventh drive gear (16D) adapted to be mounted onto said odd shaft (16) through a seventh drive gear driven bush (16Db) at a predetermined position;

a plurality of even drive gears (18Y) comprising a second drive gear (18A) adapted to be mounted onto said even shaft (18) through a second drive gear driven bush (18Ab) at a predetermined position, a fourth drive gear (18B) adapted to be mounted onto said even shaft (18) through a fourth drive gear driven bush (18Bb) at a predetermined position, a sixth drive gear (18C) is mounted onto said even shaft (18) through a sixth drive gear driven bush (18Cb) at a predetermined position and a eighth drive gear (18D) is mounted onto said even shaft (18) through an eighth drive gear driven bush (18Db) at a predetermined position;

a plurality of driven gears (20X) comprising a first and second driven gear (20A) adapted to be mounted onto said output shaft (20) at a predetermined position and rotatably connected to said first drive gear (16A) and said second drive gear (18A), a third and fourth driven gear (20B) adapted to be mounted onto said output shaft (20) at a predetermined position and rotatably connected to said third drive gear (16B) and said fourth drive gear (18B), a fifth and sixth driven gear (20C) adapted to be mounted onto said output shaft (20) at a predetermined position and rotatably connected to said fifth drive gear (16C) and said sixth drive gear (18C), and seventh and eighth driven gear (20D) adapted to be mounted onto said output shaft (20) at a predetermined position and rotatably connected to said seventh drive gear (16D) and said eighth drive gear (18D);

a plurality of odd synchronizers units (22) comprising a first and fifth synchronizer unit (22A) adapted to be mounted onto said odd shaft (16) at a predetermined position between said first drive gear (16A) and said fifth drive gear (16C), and third and seventh synchronizer unit (22B) adapted to be mounted onto said odd shaft (16) at a predetermined position between said third drive gear (16B) and said seventh drive gear (16D); and a plurality of even synchronizers units (24) comprising a second and sixth synchronizer unit (24A) adapted to be mounted onto said even shaft (18) at a predetermined position between said second drive gear (18A) and said sixth drive gear (18C), and fourth and eighth synchronizer unit (24B) adapted to be mounted onto said even shaft (18) at a predetermined position between said fourth drive gear (18B) and said eighth drive gear (18D);

an odd shaft drive gear (10Xa) adapted to be mounted onto said wet clutch shaft (10W) through an odd shaft drive gear driven bush (10Xc) at a predetermined position;

an even shaft drive gear (10Ya) adapted to be mounted onto said wet clutch shaft (10W) through an even shaft drive gear driven bush (10Yc) at a predetermined position;

a dual clutch unit (10D) adapted to be mounted onto said wet clutch shaft (10W) at a predetermined position between said odd shaft drive gear (10Xa) and said even shaft drive gear (10Ya), said dual clutch unit (10D) comprising an odd clutch unit (10E) adapted to drive said odd shaft drive gear (10Xa) on actuation of said odd clutch unit (10E) and an even clutch unit (10F) adapted to drive said even shaft drive gear (10Ya) on actuation of said even clutch unit (10F);

an odd shaft driven gear (10Xb) adapted to be mounted onto said odd shaft (16) of said multi-speed transmission unit (10T) at a predetermined position and rotatably connected to said odd shaft drive gear (10Xa);

an even shaft driven gear (10Yb) is mounted to said even shaft (18) of said multi-speed transmission unit (10T) at a predetermined position and rotatably connected to said even shaft drive gear (10Ya);

a range transmission unit (10R) comprising a range driving shaft (26) adapted to be rotatably connected to said output shaft (20) of said multi-speed transmission unit (10T);

a range driven shaft (28);

a low range drive gear (30) adapted to be integrated with said driving shaft (26);

a medium range drive gear (32) adapted to be mounted onto said range driving shaft (26) at a predetermined position;

a low range driven gear adapted to be mounted onto said range driven shaft (28) through a low range driven gear driven bush (34B) at a predetermined position and rotatably connected to said low range drive gear (30);

a medium range driven gear (36) adapted to be mounted onto said range driven shaft (28) through a medium range driven gear driven bush (36B) at a predetermined position and rotatably connected to said medium range drive gear (32);

a high range coupler (20H) adapted to be integrated with said output shaft (20) of the multi-speed transmission unit (10T) at a predetermined position;

a transmission control mechanism (100) comprising a transmission shift lever (102), a gear shift lever support arrangement (103), a shift gate element (104), a gear shift lever auto-return mechanism (105), a shifter arm (106), an input ratchet shifting assembly (108), an input shift ratchet and cam assembly (110), a drive shaft (112), a plurality of keys (113), a driven shaft (114), a coupler (115), a driven shaft drive gear (116), a driven shaft driven gear (118), a plurality of rail shifting means (120), a plurality of bushes (121), a plurality of rail shifter support members (122), a plurality of pawl assemblies (124), a plurality of pawl kicker means (126), a plurality of shift rails (128), a plurality of shift rail-ends (130), a plurality of synchronizers units (132), a plurality of shift forks (134), a lever position control valve assembly (136), an active detent control valve assembly (138), a detent control valve assembly (140), a clutch selection control valve assembly (142), a lever position valve lever (144) and a master clutch control valve assembly (100M); and an auxiliary actuation mechanism (200) comprising transmission actuating gear (202);

a gear driven bush (204);

a gear actuating means (206);

a shift fork (208); a shift rail (210);
a clutch control valve actuating arm (212);
a rail shifting means (214);
a rail shifter turn link (21);
a coupler (218); an auxiliary transmission actuating shift lever (220);
a rail shifter locking means (22);
a spacer (224);
a detent engaging element (226);
a spring (228);
a spring retainer (230).

2. The manual dual clutch power transmission unit (10) as claimed in claimed in claim 1, wherein said transmission shift lever (102) is a mono-stable gear shift lever, where said transmission shift lever (102) is provided with a Z-gate sequential gear shift pattern.

3. The manual dual clutch power transmission unit (10) as claimed in claimed in claim 1, wherein the shift gate element (104) having a shift gate (104G) defining an upshift gate (104U) adapted to facilitate upshift movement of said transmission shift lever (102), and a downshift gate (104D) adapted to facilitate downshift movement of said transmission shift lever (102), wherein the upshift gate (104U) and the downshift gate (104D) of the shift gate (104G) defines a shift lever initial position in between each other.

4. The manual dual clutch power transmission unit (10) as claimed in claimed in claim 1, wherein said even shaft (18) and said odd shaft (16) is disposed above said output shaft (20) of said multi-speed transmission unit (10T).

\* \* \* \* \*